United States Patent
Brody et al.

(10) Patent No.: US 12,447,147 B2
(45) Date of Patent: Oct. 21, 2025

(54) METHODS OF TREATING, AMELIORATING, AND/OR PREVENTING CANCER USING PYRVINIUM COMPOSITIONS

(71) Applicant: Thomas Jefferson University, Philadelphia, PA (US)

(72) Inventors: Jonathan R. Brody, Philadelphia, PA (US); Christopher William Schultz, Riverton, NJ (US)

(73) Assignee: Thomas Jefferson University, Philadelphia, PA (US)

( * ) Notice: Subject to any disclaimer, the term of this patent is extended or adjusted under 35 U.S.C. 154(b) by 813 days.

(21) Appl. No.: 17/770,515

(22) PCT Filed: Oct. 21, 2020

(86) PCT No.: PCT/US2020/056641
§ 371 (c)(1),
(2) Date: Apr. 20, 2022

(87) PCT Pub. No.: WO2021/081081
PCT Pub. Date: Apr. 29, 2021

(65) Prior Publication Data
US 2022/0409611 A1    Dec. 29, 2022

Related U.S. Application Data

(60) Provisional application No. 62/924,495, filed on Oct. 22, 2019.

(51) Int. Cl.
*A61K 31/4725* (2006.01)
*A61K 47/14* (2017.01)
*A61K 47/44* (2017.01)
*A61P 35/00* (2006.01)

(52) U.S. Cl.
CPC .......... *A61K 31/4725* (2013.01); *A61K 47/14* (2013.01); *A61K 47/44* (2013.01); *A61P 35/00* (2018.01)

(58) Field of Classification Search
None
See application file for complete search history.

(56) References Cited

U.S. PATENT DOCUMENTS

| | | |
|---|---|---|
| 2012/0064008 A1 | 3/2012 | Zetter et al. |
| 2019/0209549 A1 | 7/2019 | Arline et al. |

FOREIGN PATENT DOCUMENTS

| | | | |
|---|---|---|---|
| JP | 2004189712 A | 7/2004 | |
| WO | WO 2006/078754 A1 * | 7/2006 | ............ A61K 31/45 |
| WO | 2017178524 A1 | 10/2017 | |

OTHER PUBLICATIONS

"International Search Report and Written Opinion dated Feb. 1, 2021 for International Application No. PCT/US20/56641".
Bartoschek, et al., "Spatially and functionally distinct subclasses of breast cancer-associated fibroblasts revealed by single cell RNA sequencing", Nature Communications vol. 9, Article No. 5150, 2018.
Bolaji, et al., "The Targeting of HuR by Pyrvinium Pamoate Effectively Kills PDAC Cells in Combination With Other Chemotherapeutics", Poster presentation the Pancreas Club, 2018.
Deng, et al., "Pyrvinium targets autophagy addiction to promote cancer cell death", Cell Death Dis. May 2, 2013;4(5): e614, May 2, 2013.
Guo, et al., "Inhibiting cytoplasmic accumulation of HuR synergizes genotoxic agents in urothelial carcinoma of the bladder", Oncotarget. ;7(29):, Jul. 19, 2016, 45249-45262.
Jones, et al., "Non-competitive androgen receptor inhibition in vitro and in vivo", Proc Natl Acad Sci U S A.;106(17), Apr. 28, 2009, 7233-8.
Schultz, et al., "Gaps in the Armor: Targeting HuR to Sensitize Pancreatic Cancer", AACR poster presentation, 2018.
Schultz, et al., "Targeting HuR to treat pancreatic cancer", Sigma Xi Research Day TJU—Poster, 2018.
Smith, et al., "Absorption of pyrvinium pamoate", Clin Pharmacol Ther. Jun. 1976;19(6):802-6., Jun. 1976, 802-6.
Xu, et al., "The Antihelmintic Drug Pyrvinium Pamoate Targets Aggressive Breast Cancer", PLoS One. Aug. 27, 2013;8(8):e71508;, Aug. 27, 2013.
Brody, et al., "Complex HuR function in pancreatic cancer cells", Wiley interdisciplinary reviews. RNA vol. 9,3,[retrieved on Oct. 12, 2020], Retrieved from Internet <URL:https://www .ncbi.nlm.nih.gov/pmc/articles/PMC6040811/ ><DO1:10.1002/wrna. 1469>, Feb. 13, 2018.

* cited by examiner

*Primary Examiner* — Brian J Davis
(74) *Attorney, Agent, or Firm* — Saul Ewing LLP; Domingos J. Silva; Dennis Ostrovsky

(57) ABSTRACT

Described herein are compositions of pyrvinium salts suitable for oral administration. These compositions are in the form of solutions and demonstrate bioavailability both in blood plasma and in pancreatic tissue. Also described herein are methods of treating, ameliorating, and/or preventing pancreatic cancer, including orally administering a composition comprising pyrvinium pamoate.

20 Claims, 29 Drawing Sheets

METHODS OF TREATING, AMELIORATING, AND/OR PREVENTING CANCER USING PYRVINIUM COMPOSITIONS

CROSS-REFERENCE TO RELATED APPLICATIONS

The present application is a 35 U.S.C. § 371 national phase application from, and claims priority to, PCT International Patent Application No. PCT/US2020/056641, filed Oct. 21, 2020, which claims priority under 35 U.S.C. § 119 (e) to U.S. Provisional Patent Application No. 62/924,495, filed Oct. 22, 2019, all of which is are hereby incorporated by reference in their entireties herein.

STATEMENT REGARDING FEDERALLY SPONSORED RESEARCH

This invention was made with government support under CA212600 awarded by the National Institutes of Health and the National Cancer Institute. The government has certain rights in this invention.

BACKGROUND OF THE INVENTION

Pancreatic ductal adenocarcinoma (PDA) remains a lethal cancer with overall five year survival rates at 9%. Standard-of-care chemotherapy regimens includes the cocktail FOLFIRINOX (oxaliplatin, irinotecan, 5-FU, leucovirin) or gemcitabine as either a single agent therapy or in combination with standard DNA-damaging agents such as paclitaxel, radiation therapy, or PARP inhibitor treatment. These treatment regimens have only marginally increased disease-free survival and are ineffective in preventing recurrence and eventual death.

Therefore, there is a dire need for new targeted therapeutics that can be used to treat, ameliorate, and/or prevent PDA. The present invention addresses and meets this need.

BRIEF SUMMARY OF THE INVENTION

The present disclosure relates in part to pyrvinium compositions comprising a pyrvinium salt, a polar solvent, and an aqueous vehicle, wherein the composition is a solution. In certain embodiments, the composition comprises a non-ionic emulsifier. In certain embodiments, the pyrvinium salt is pyrvinium pamoate, having the structure:

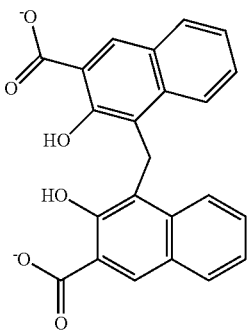

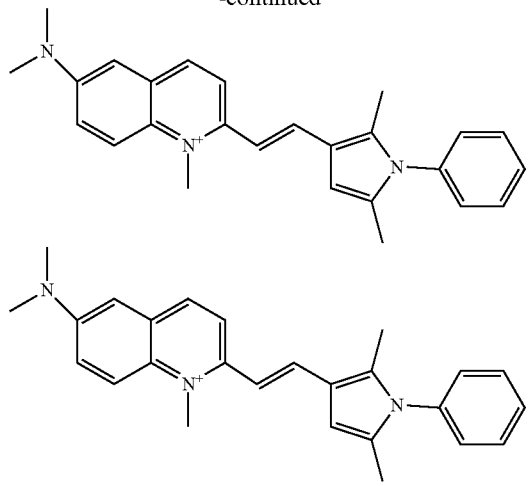

The present disclosure further relates to pharmaceutical compositions of pyrvinium compositions described herein. In certain embodiments, the pharmaceutical composition is suitable for oral administration. The present disclosure further relates to a method of decreasing chemoresistive potential of HuR protein (ELAVL1) in a subject. The present disclosure further relates to a method of treating, ameliorating, and/or preventing pancreatic cancer. In certain embodiments, the subject has at least one cancerous pancreatic tumor. In certain embodiments, the method comprises orally administering to a subject in need thereof a therapeutically effective amount of at least one pyrvinium composition of the present disclosure.

BRIEF DESCRIPTION OF THE DRAWINGS

The drawings illustrate generally, by way of example, but not by way of limitation, various embodiments of the present application.

FIG. 4A shows representative Pico green cell viability inhibition curves from Table 1. FIG. 4B shows that PP treatment reduced tumor growth in mice; After 4 million MIA-PaCa2 cells per flank were injected in nude mice and tumors were allowed to grow to 100 mm³ prior to the initiation of treatment, they were treated with vehicle or 1 mg/kg PP intraperitoneally (IP).

(i) FA targeted 3DNA laden with siHuR knocks down HuR protein levels overall; (ii) Pyrvinium Pamoate inhibits HuR's ability to translocate and accumulate in the cytoplasm, thereby inhibiting target binding.

Figure 7:
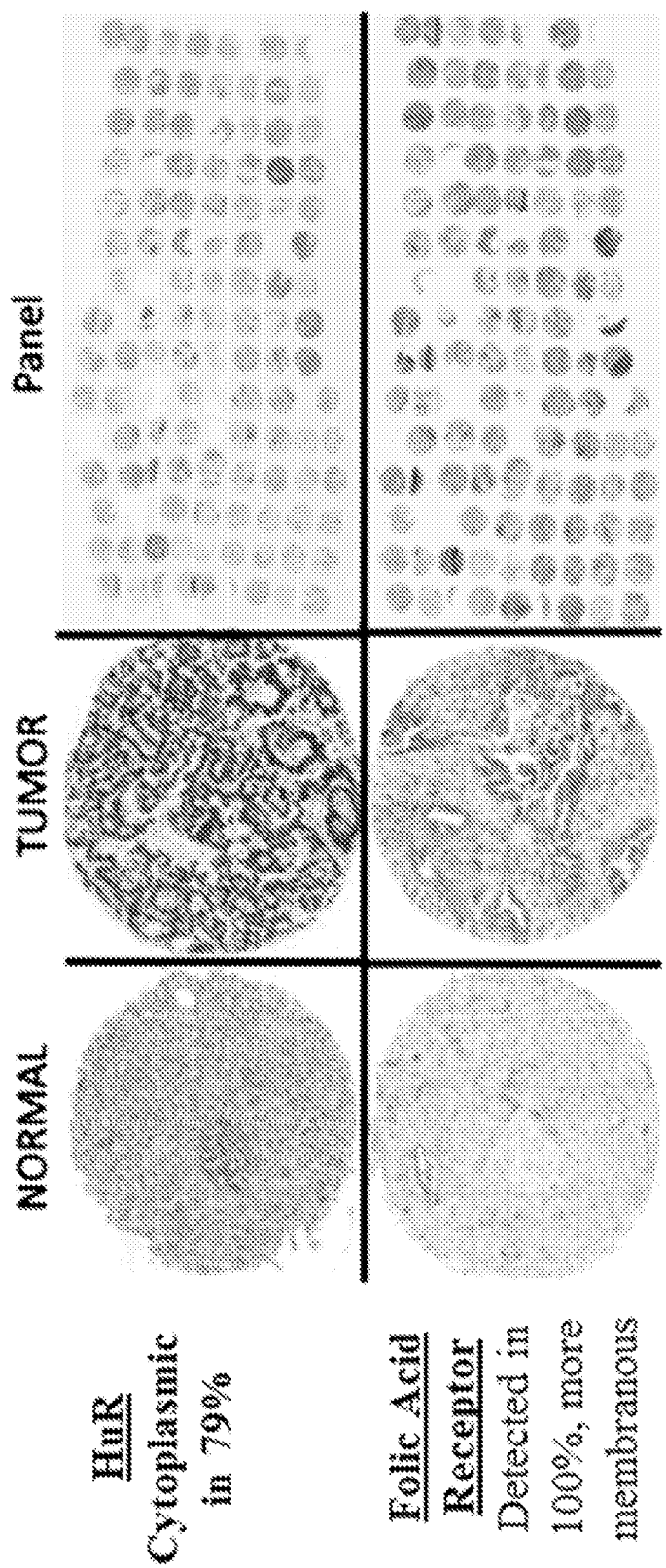

FIG. 7 shows that folic acid receptor and HuR are upregulated in patient samples, making them strong PDA targets.

Figure 8A:
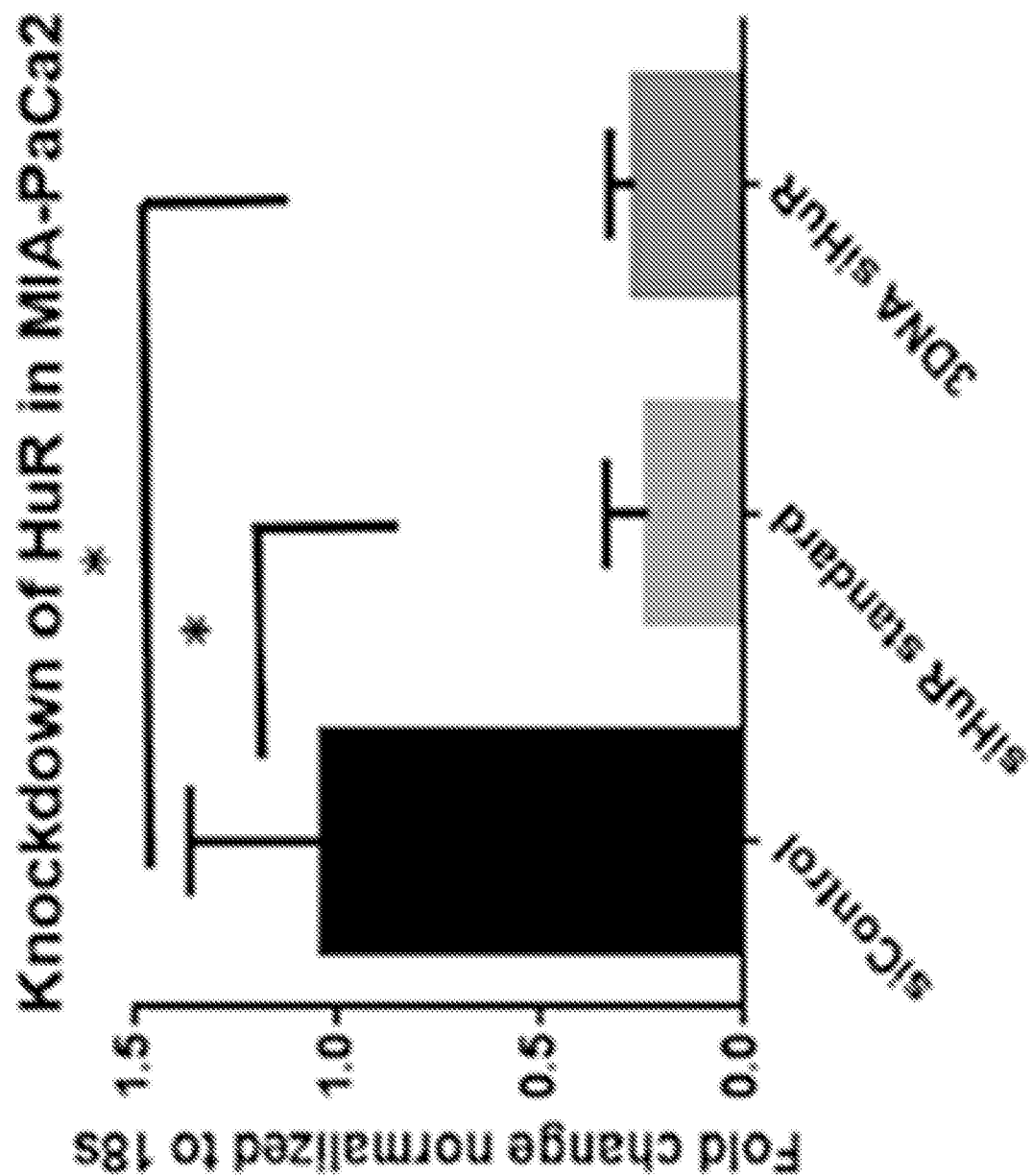
Figure 8B:
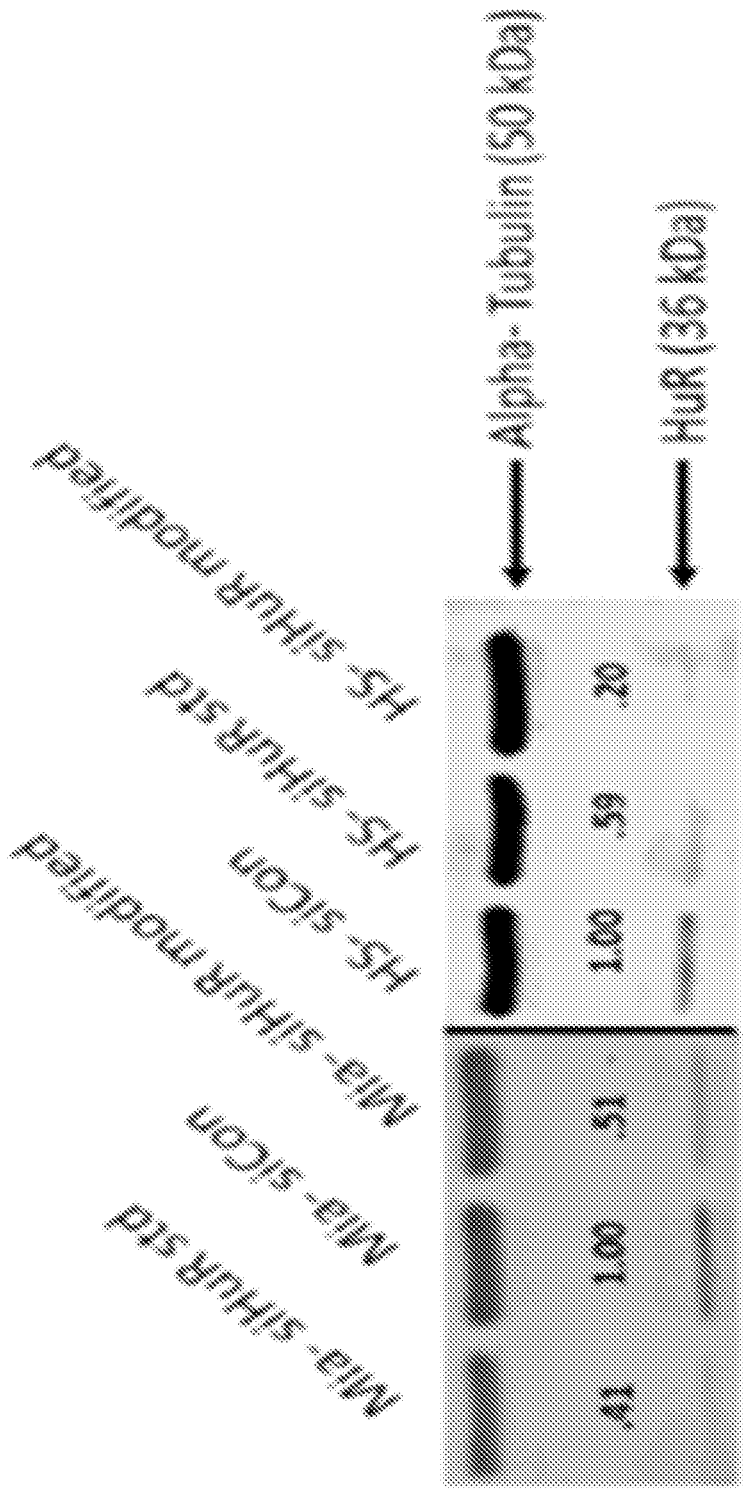
Figure 9A:
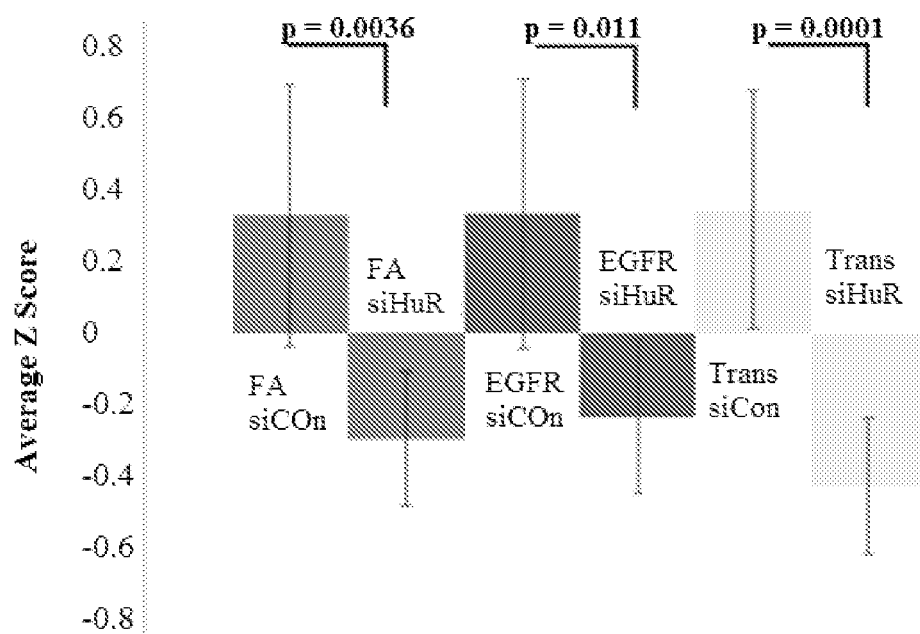
Figure 9B:
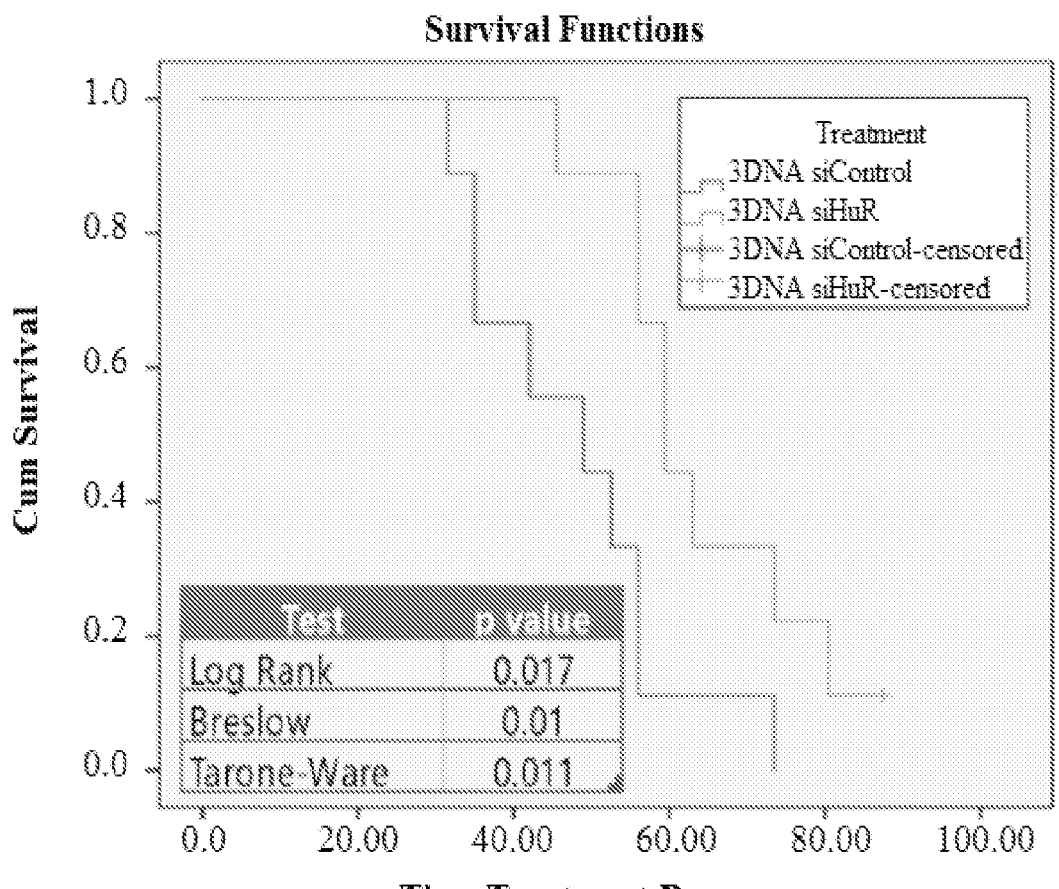
Figure 9C:
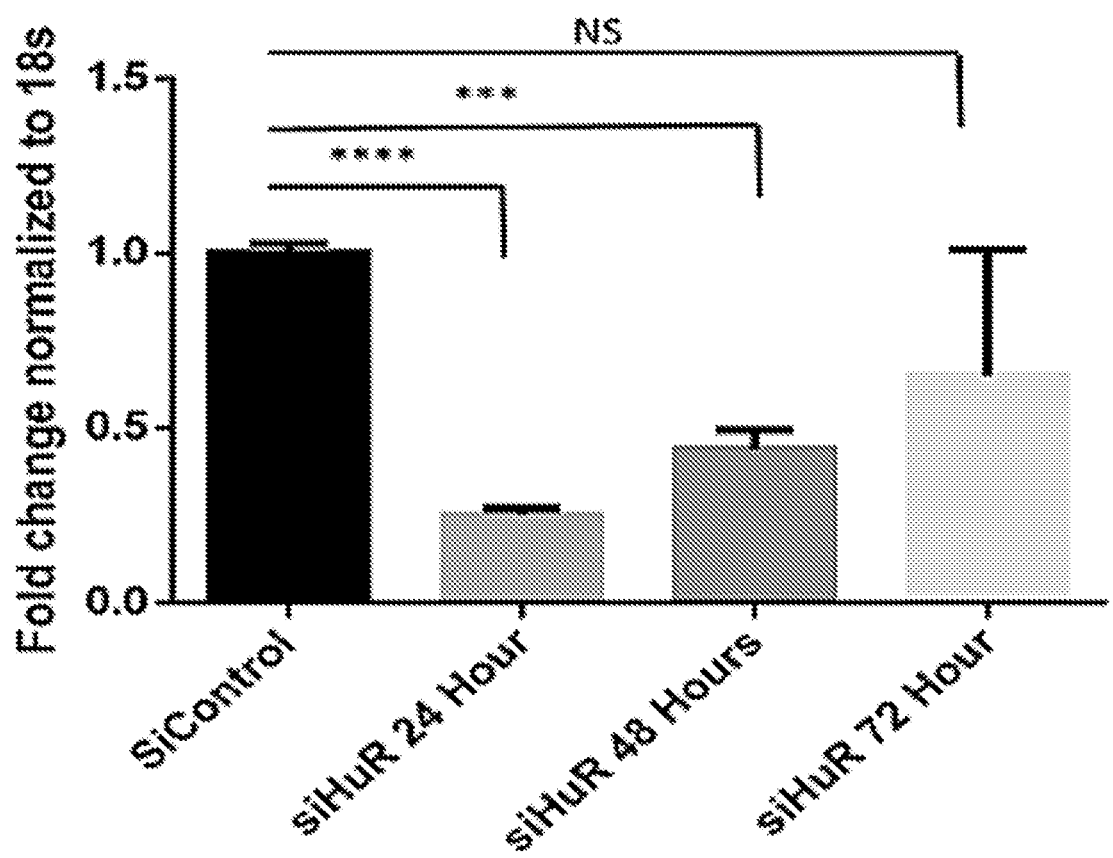
Figure 9D:
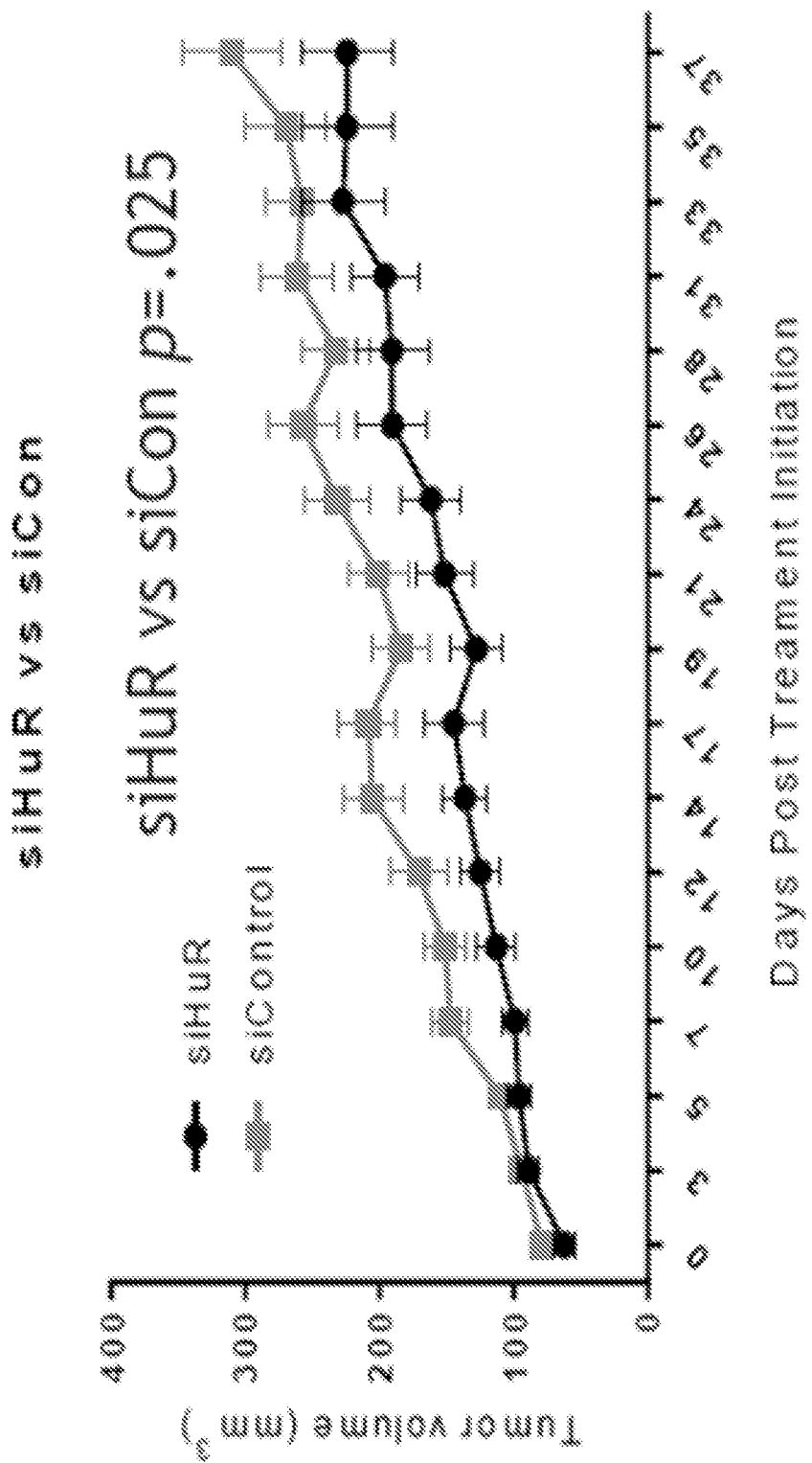
Figure 10A:
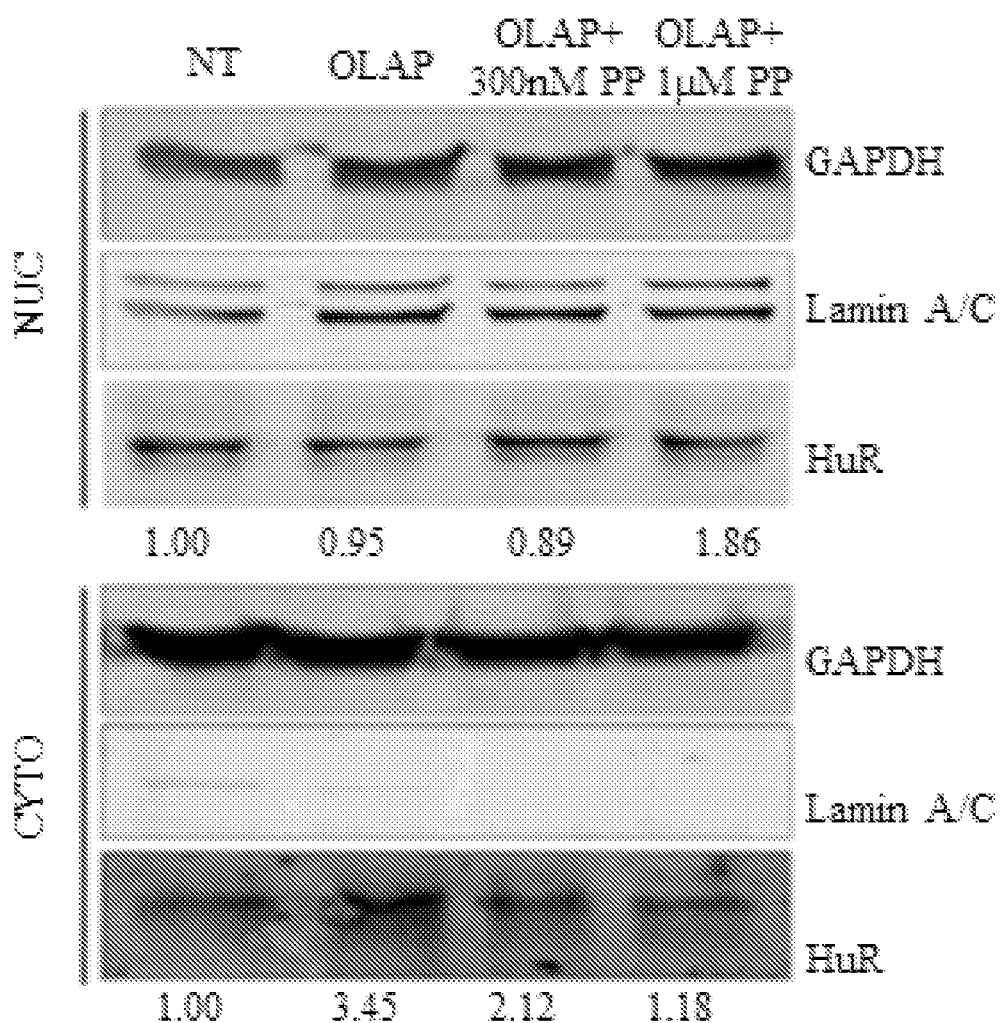
Figure 10B:
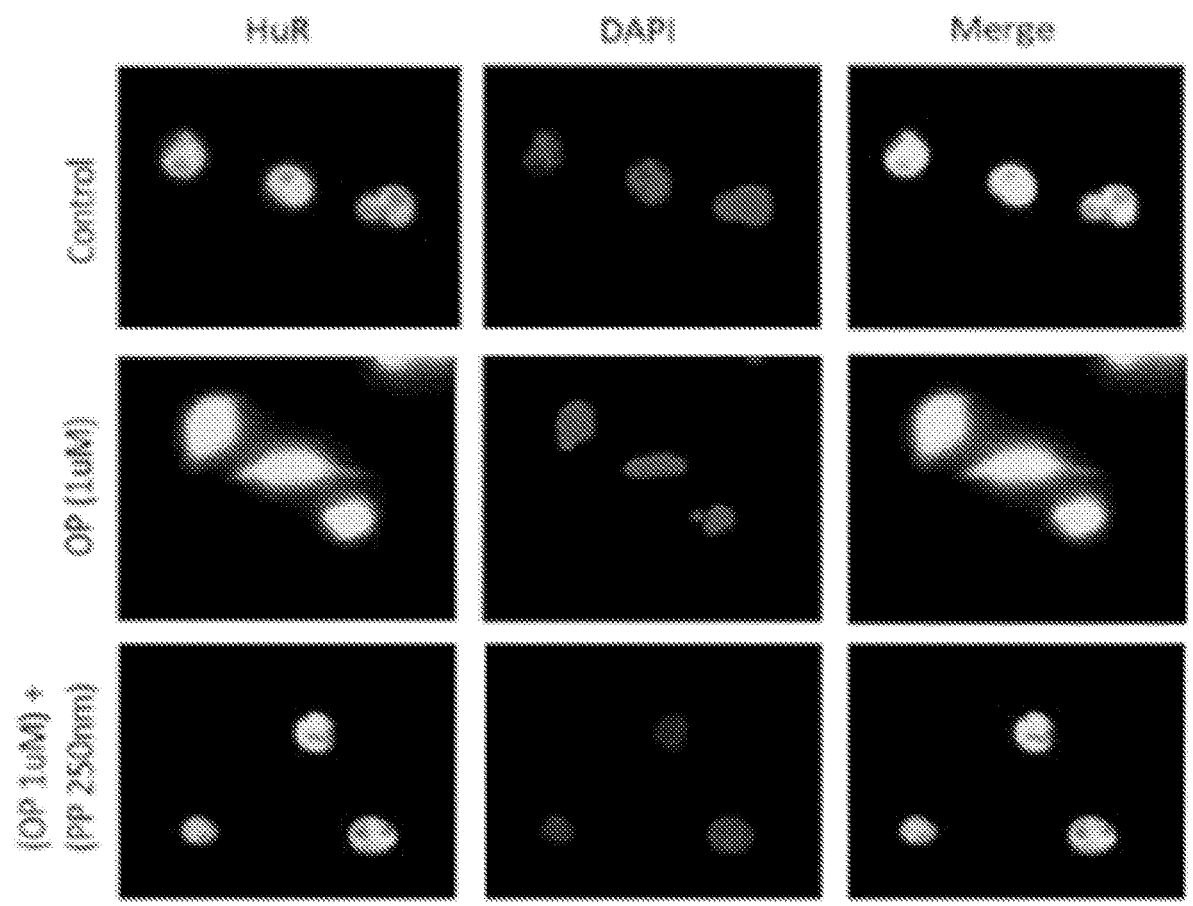
Figure 10C:
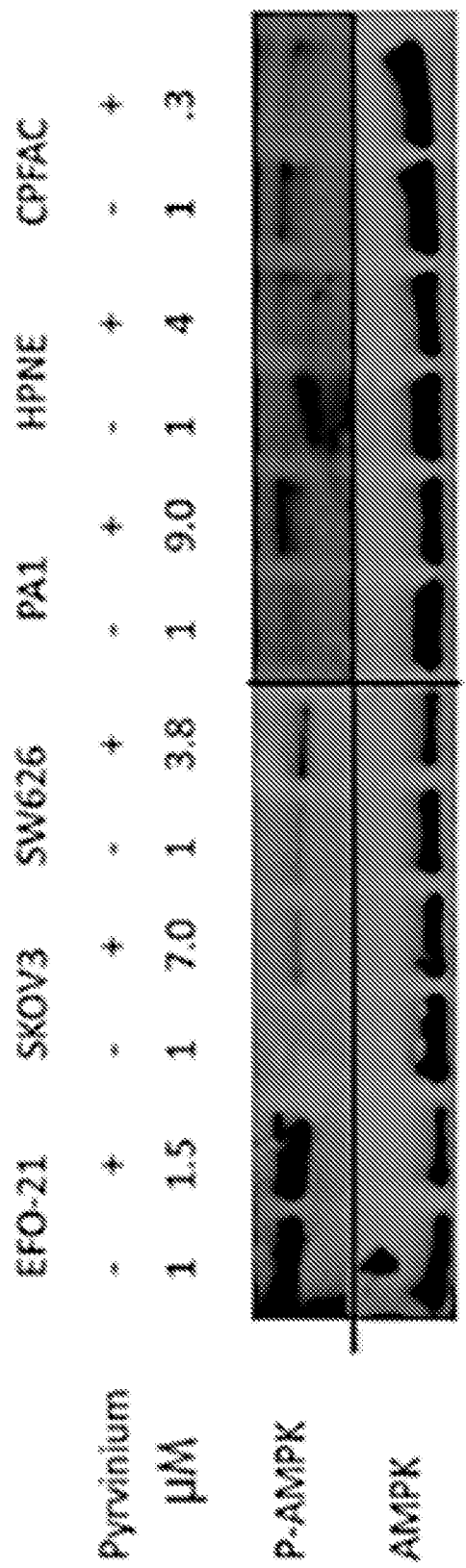
Figure 10D:
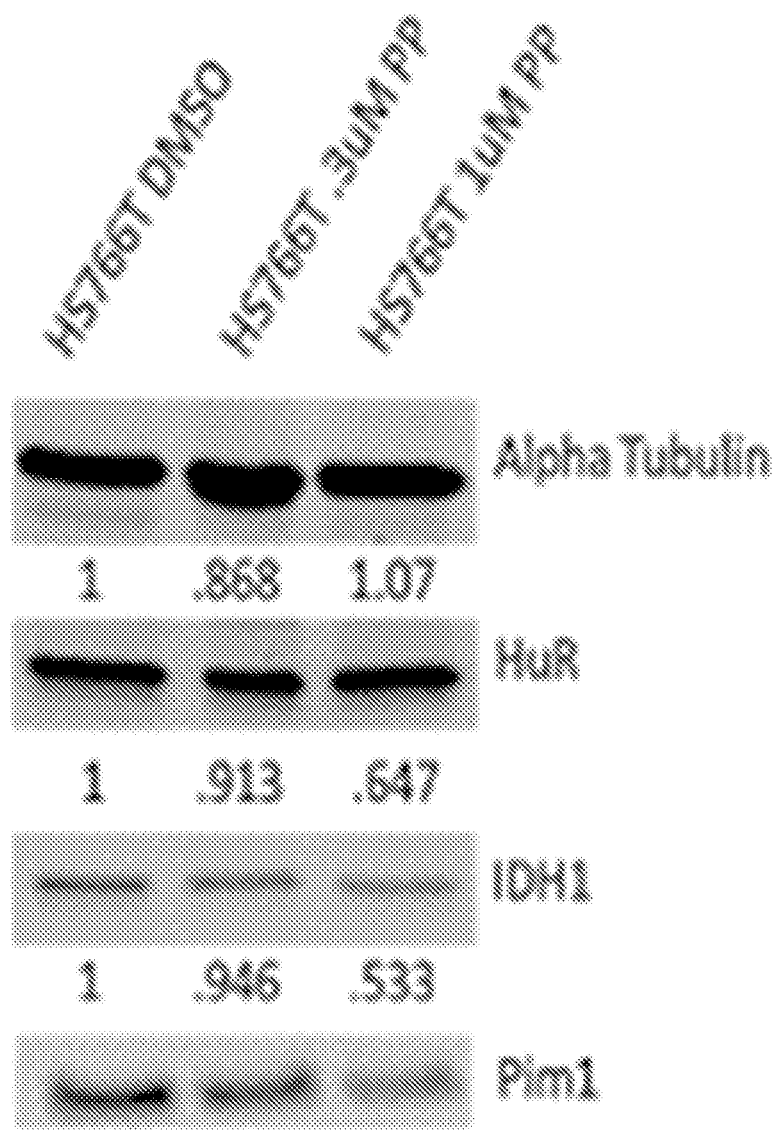

FIGS. 8A-8B show that modified HuR siRNA is effective in vitro.

FIGS. 9A-9D show that FA 3DNA siHuR is effective in vivo.

FIGS. 10A-10D illustrate that pyrvinium pamoate is an HuR inhibitor.

Figure 11A:
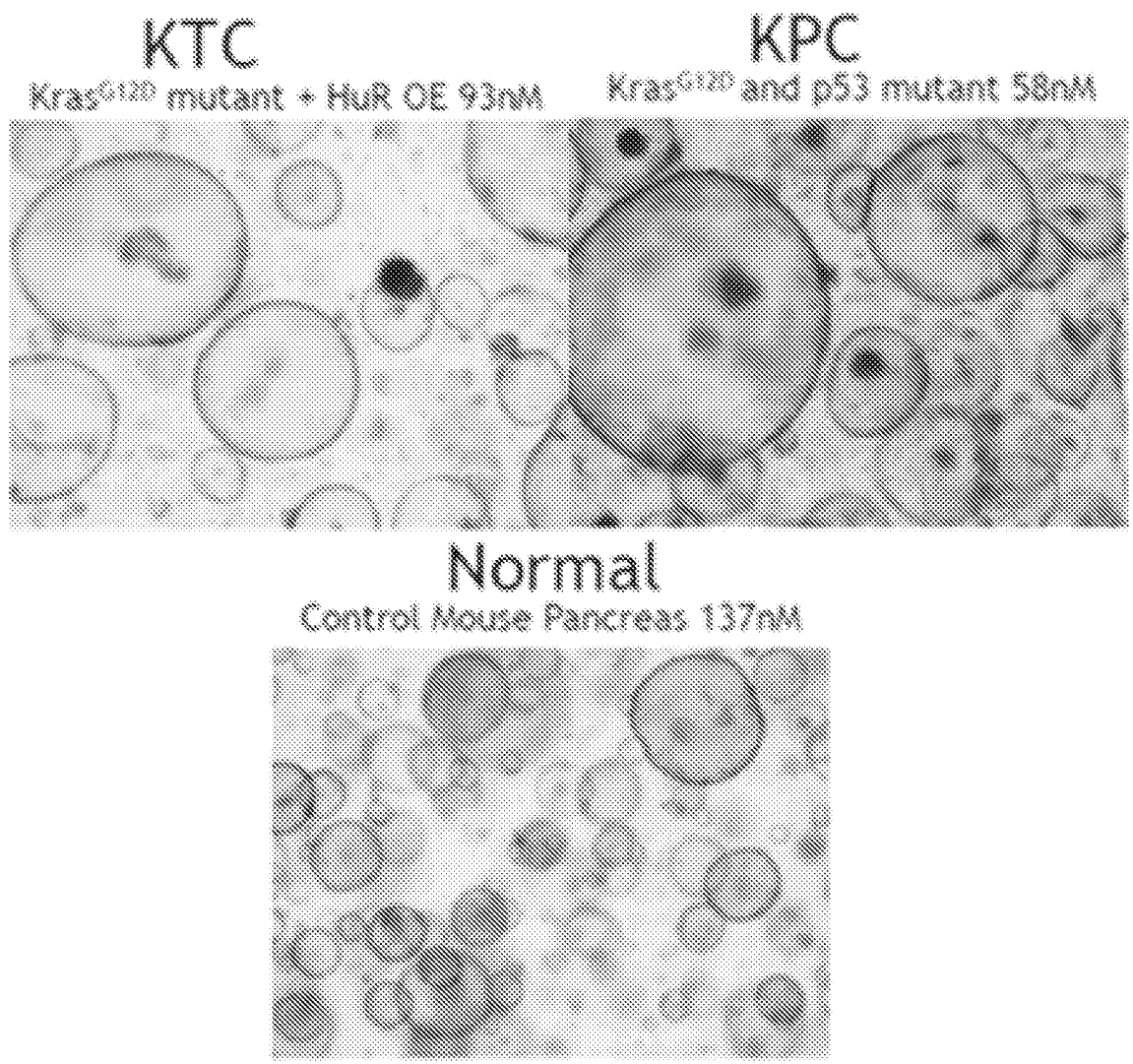
Figures 11B, 11C:
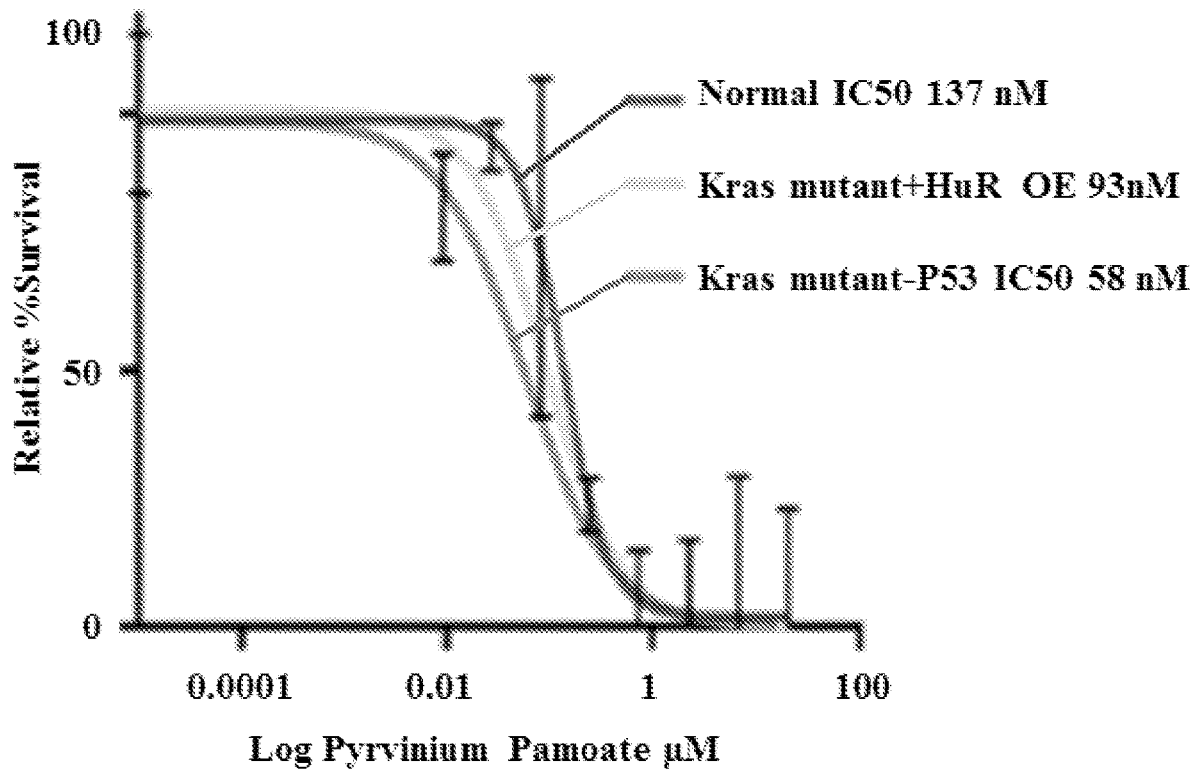

FIGS. 11A-11C show that pyrvinium pamoate kills pancreatic cancer cell lines and PDA organoids.

Figure 12:
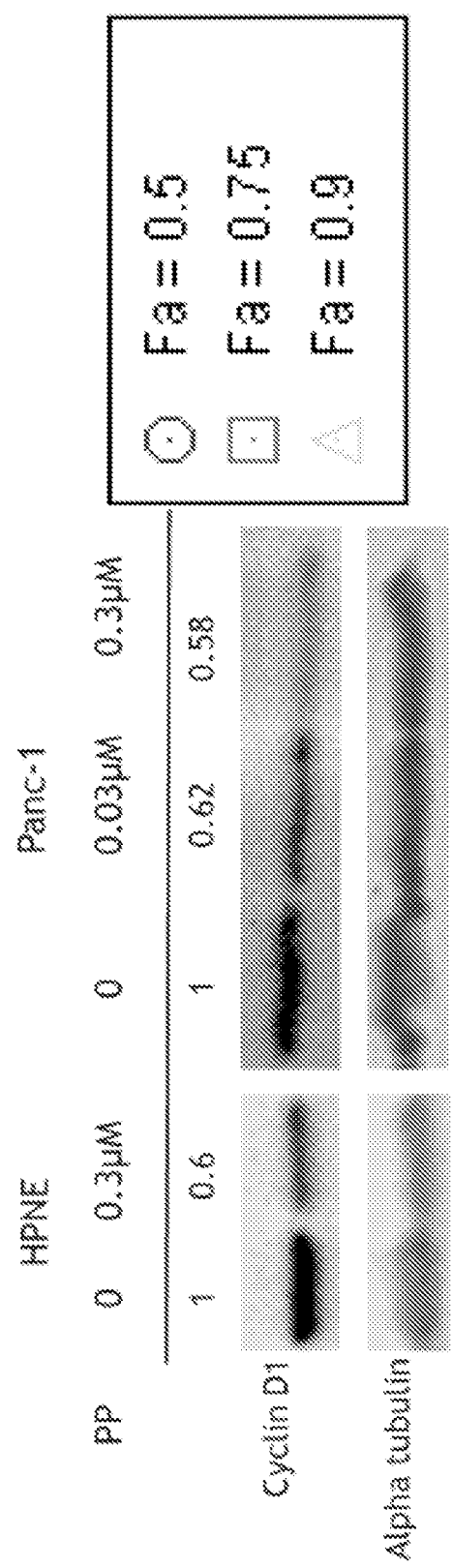
Figure 13A:
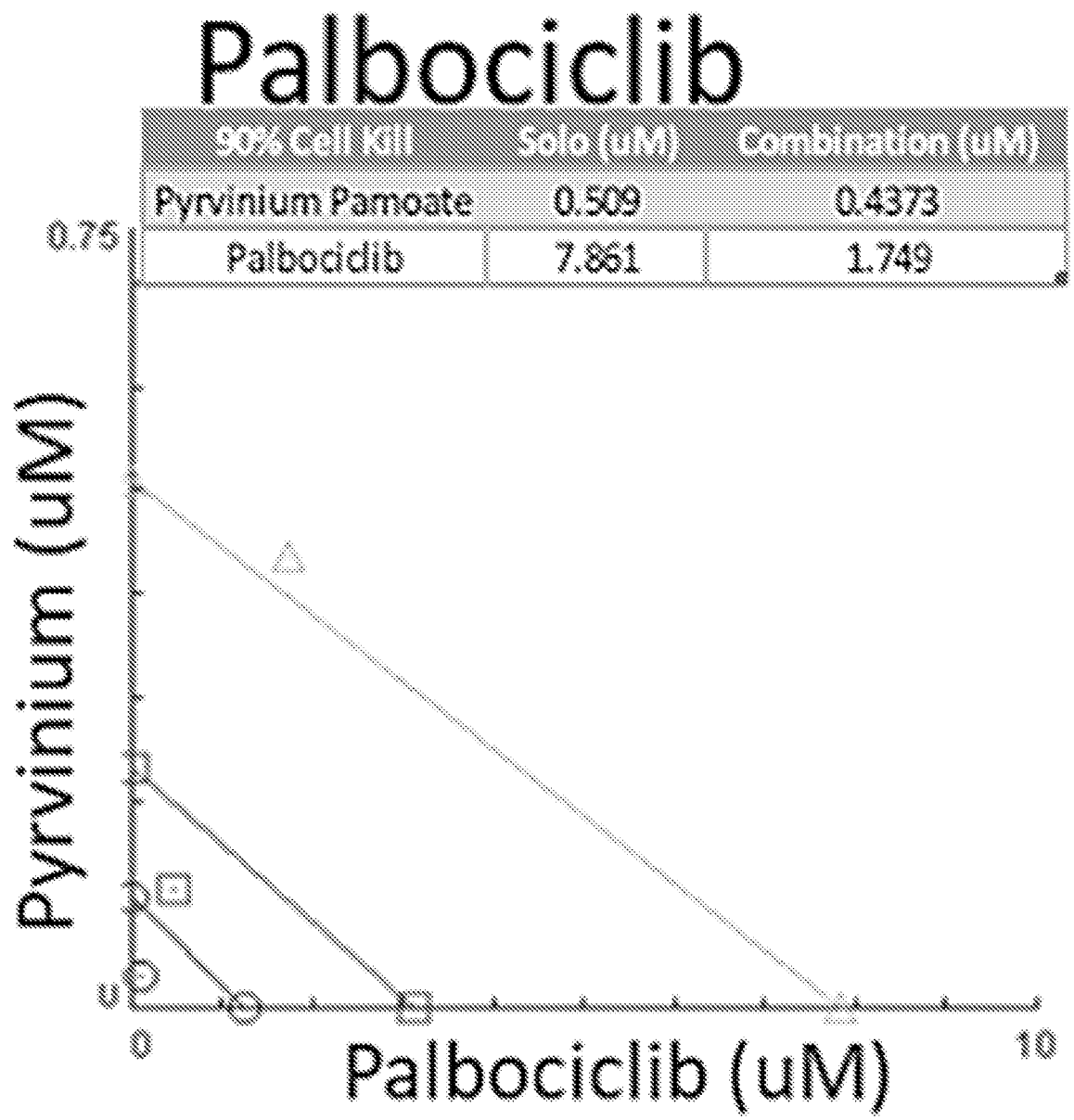
Figure 13B:
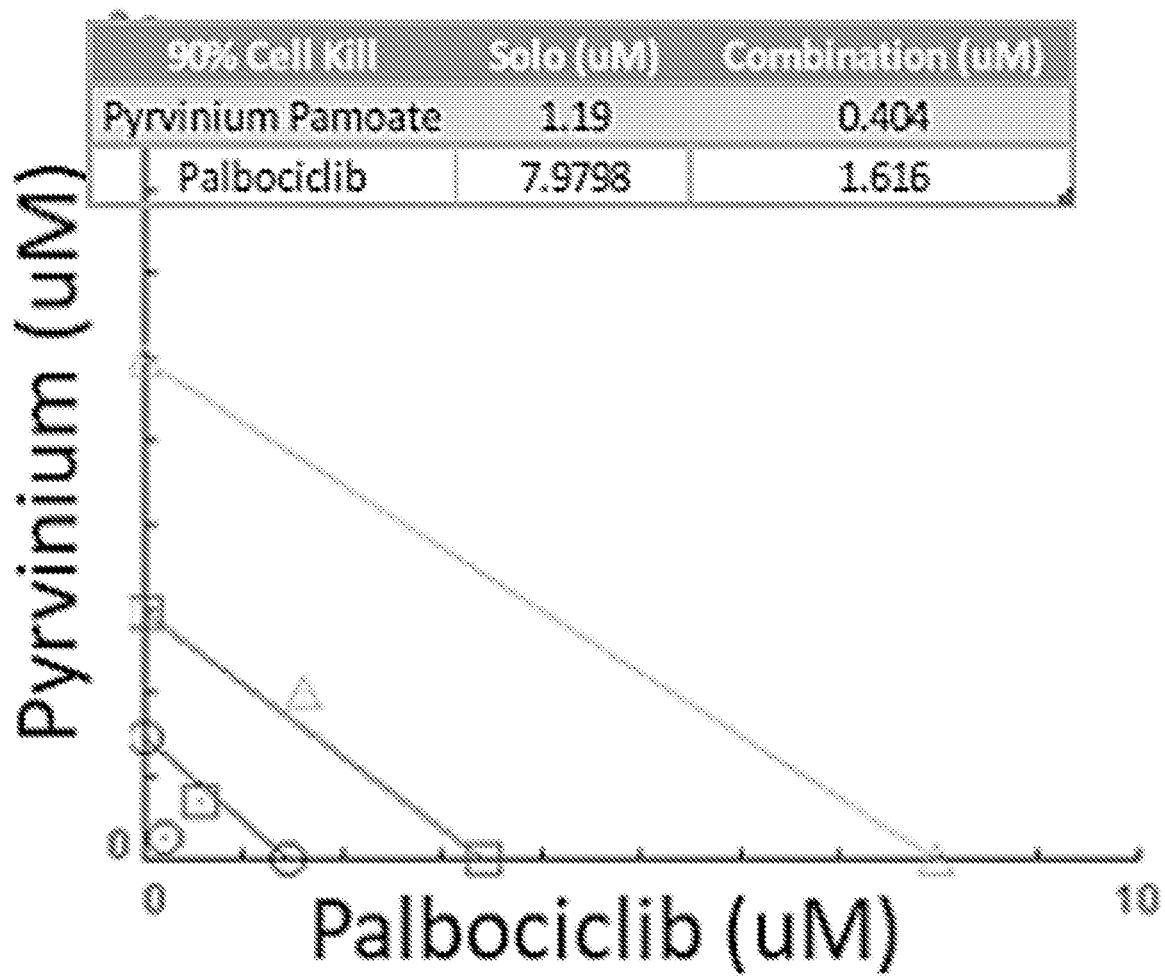
Figure 13C:
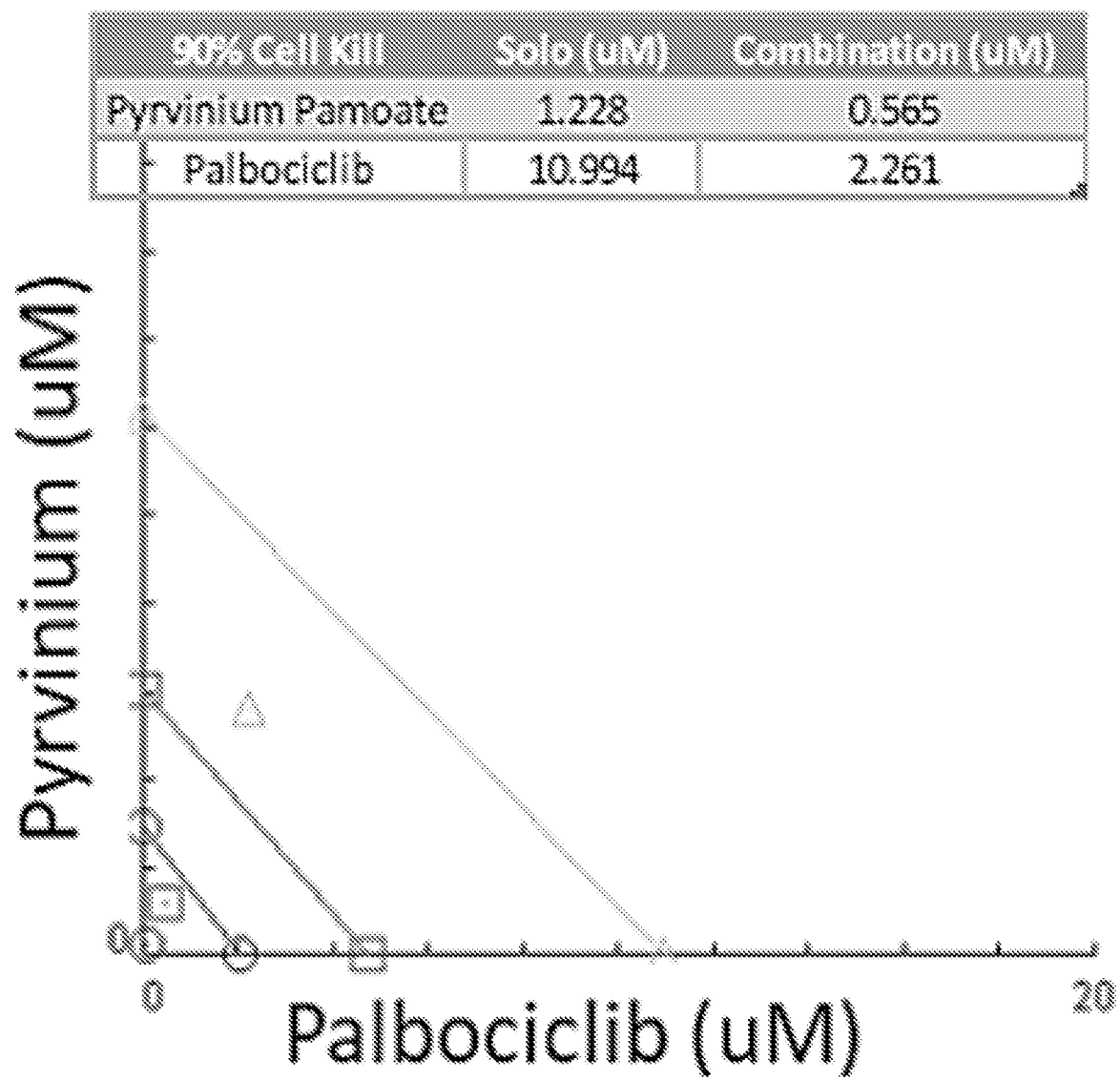
Figure 13D:
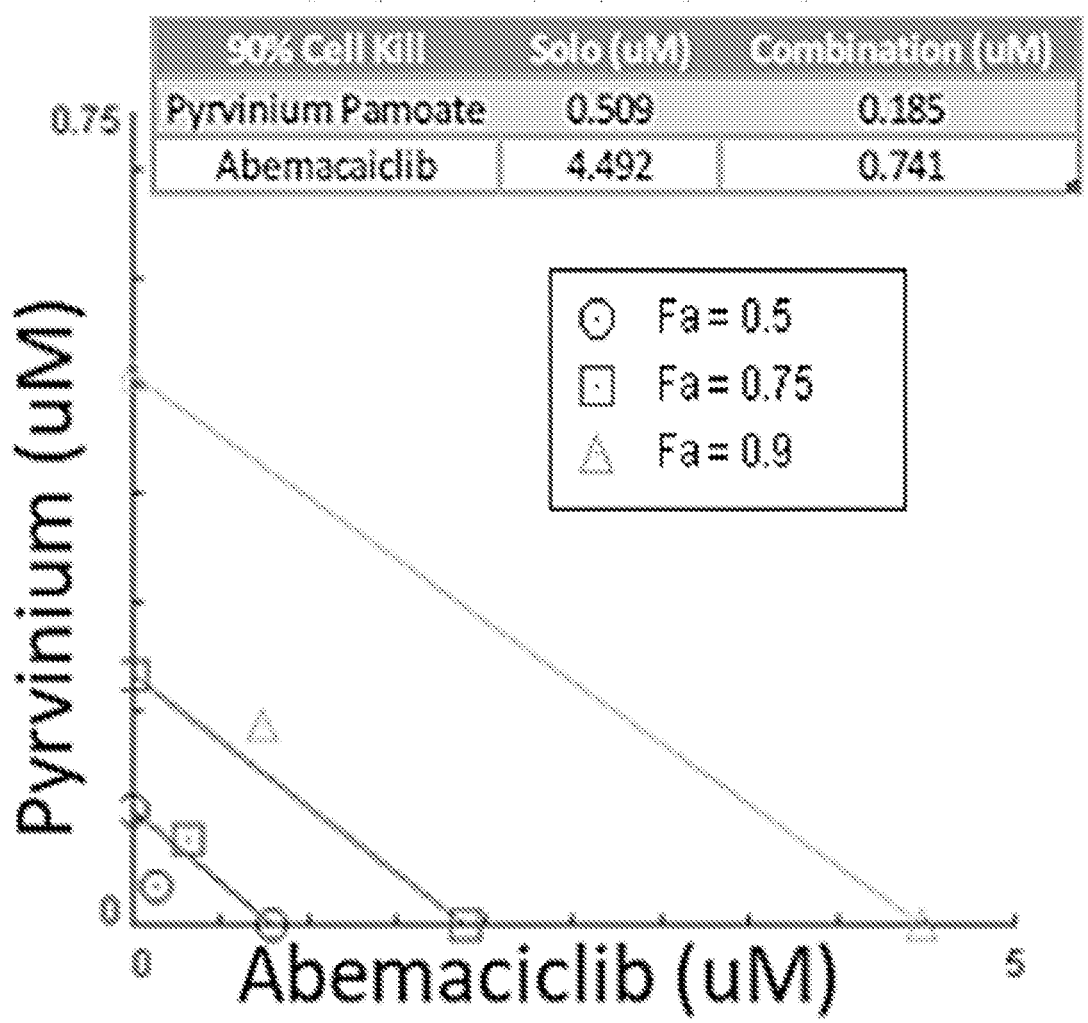
Figure 13E:
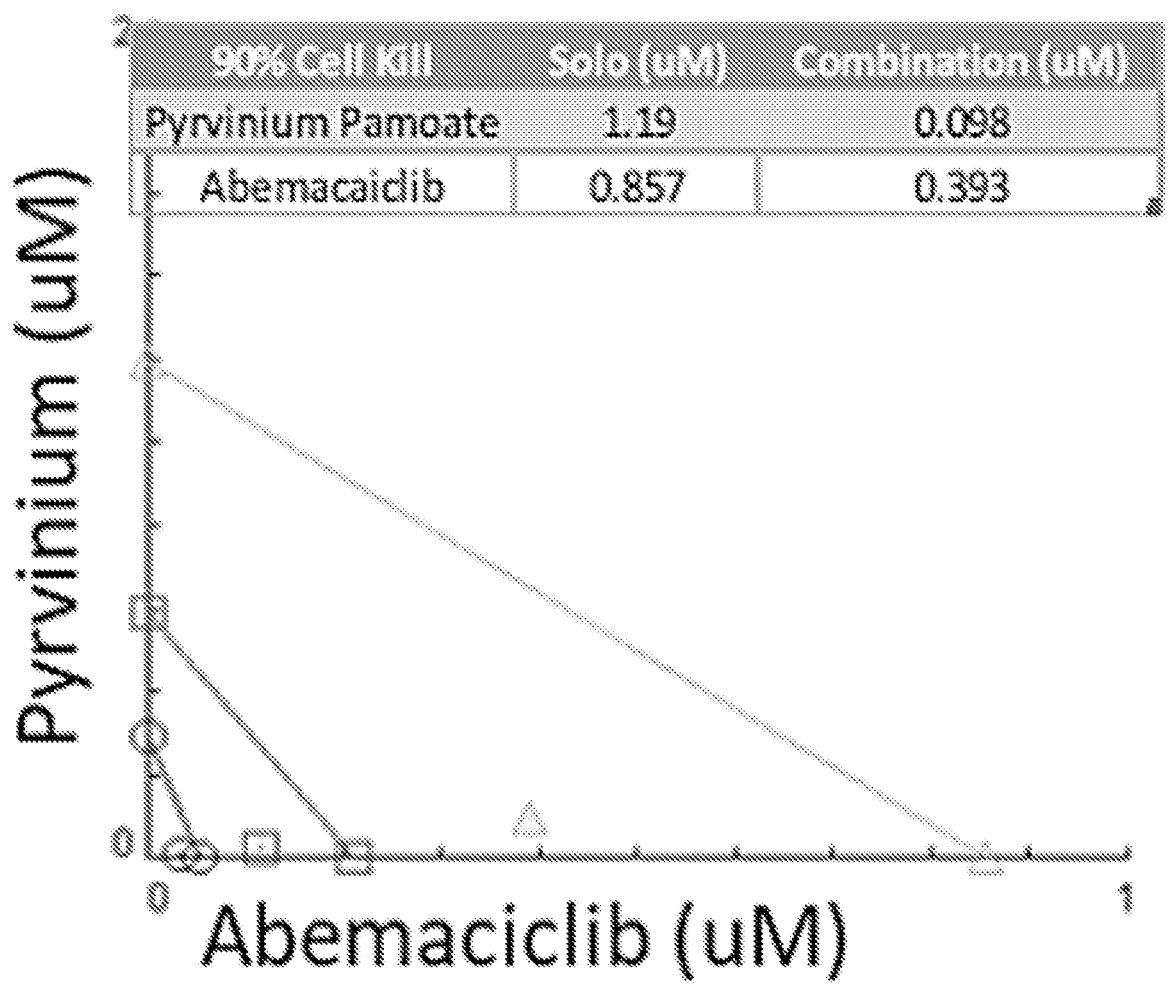
Figure 13F:
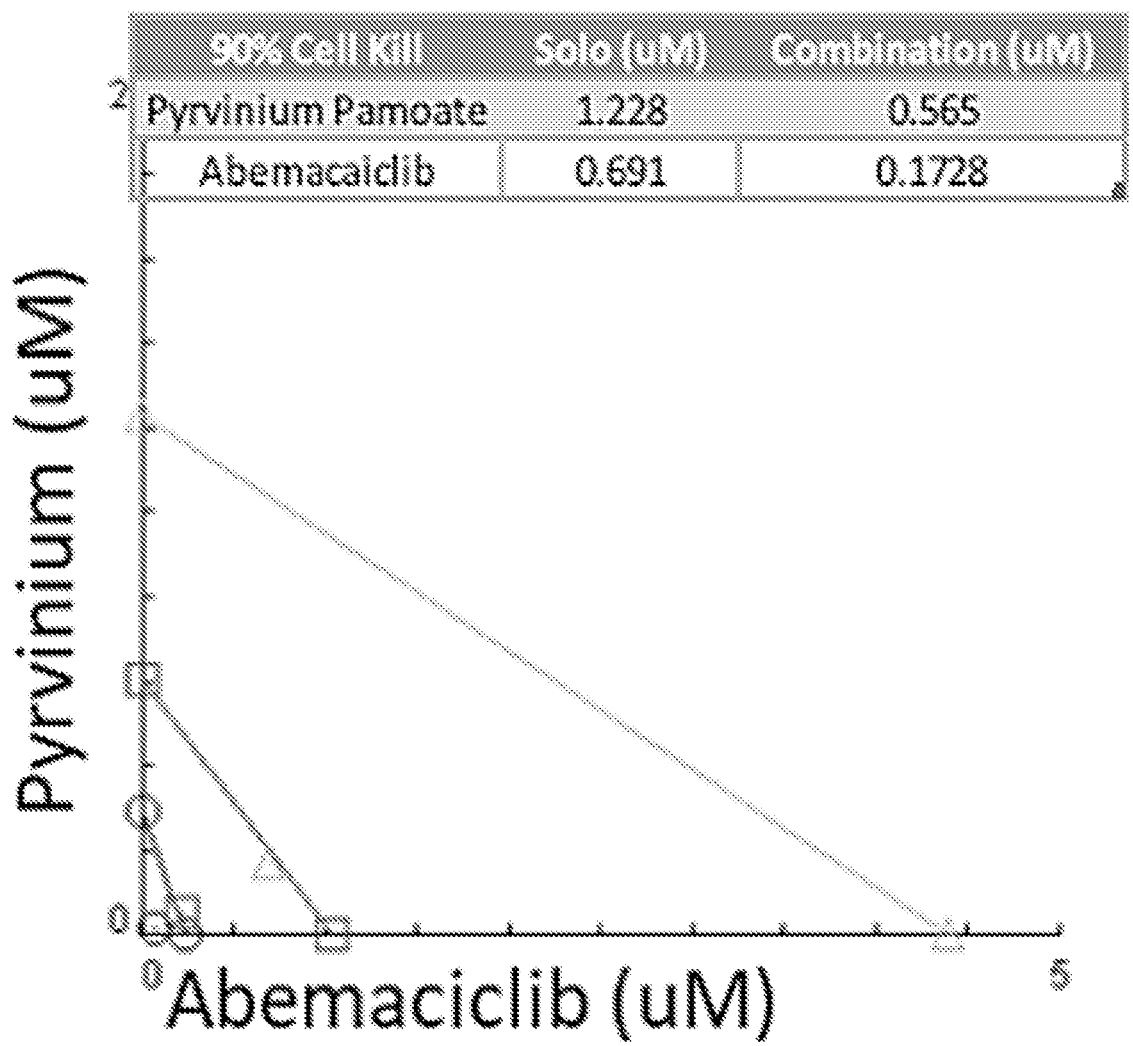

FIG. 12 shows that pyrvinium pamoate causes a knockdown of cyclin D1.

FIGS. 13A-13F show that pyrvinium pamoate exhibits a synergistic effect with CDK4/6 inhibitors.

Figure 14A:
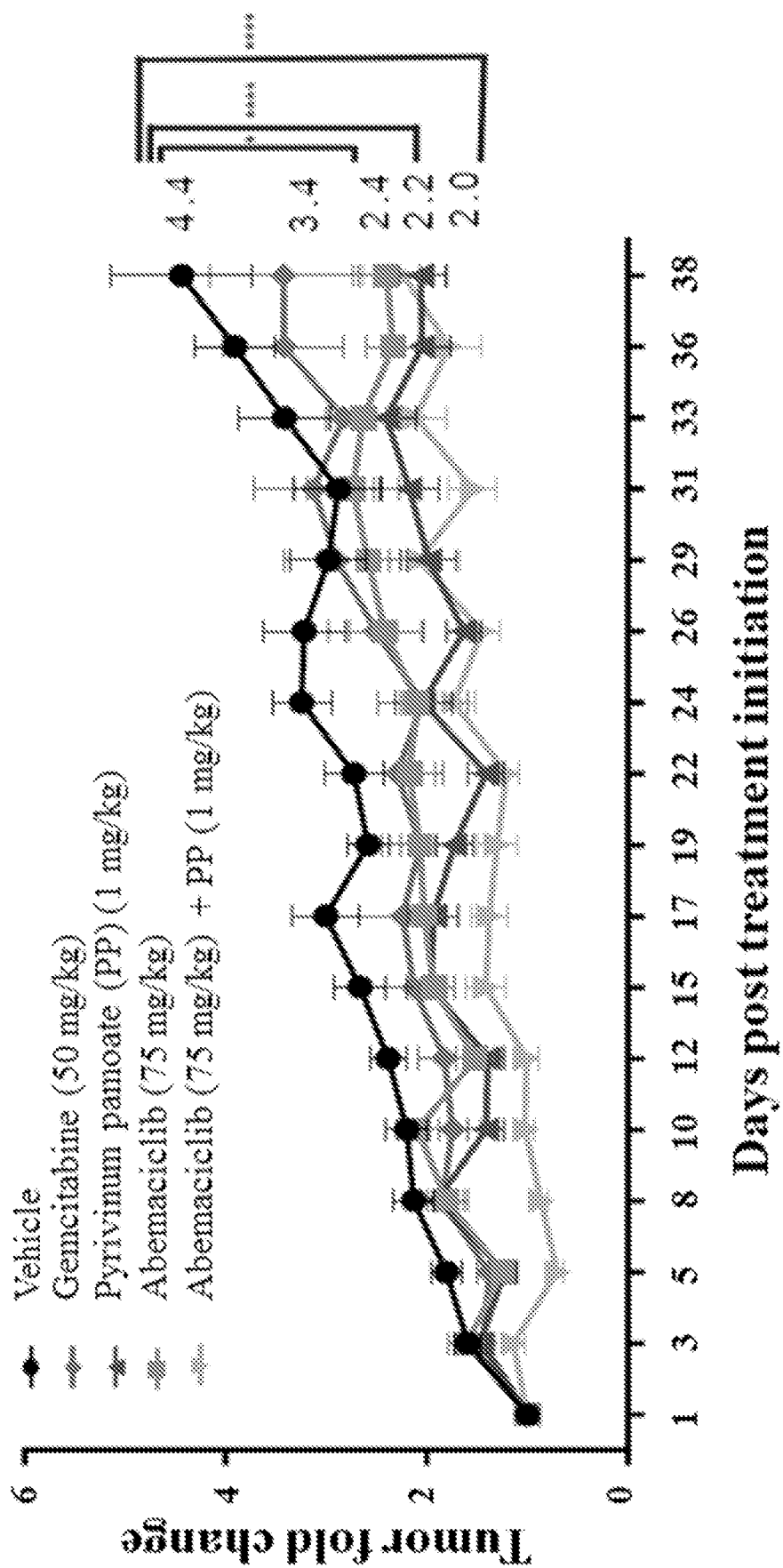
Figure 14B:
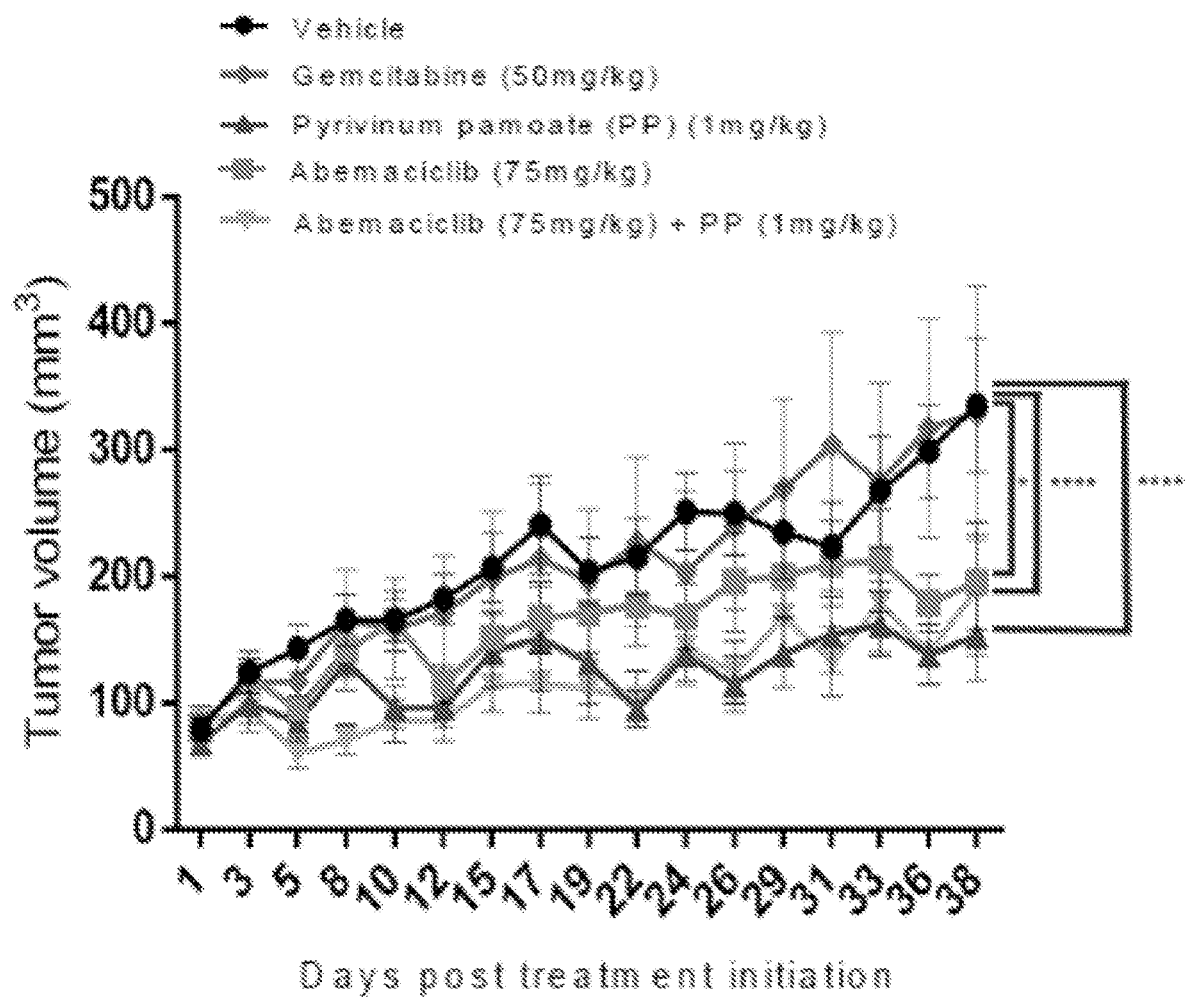
Figure 14C:
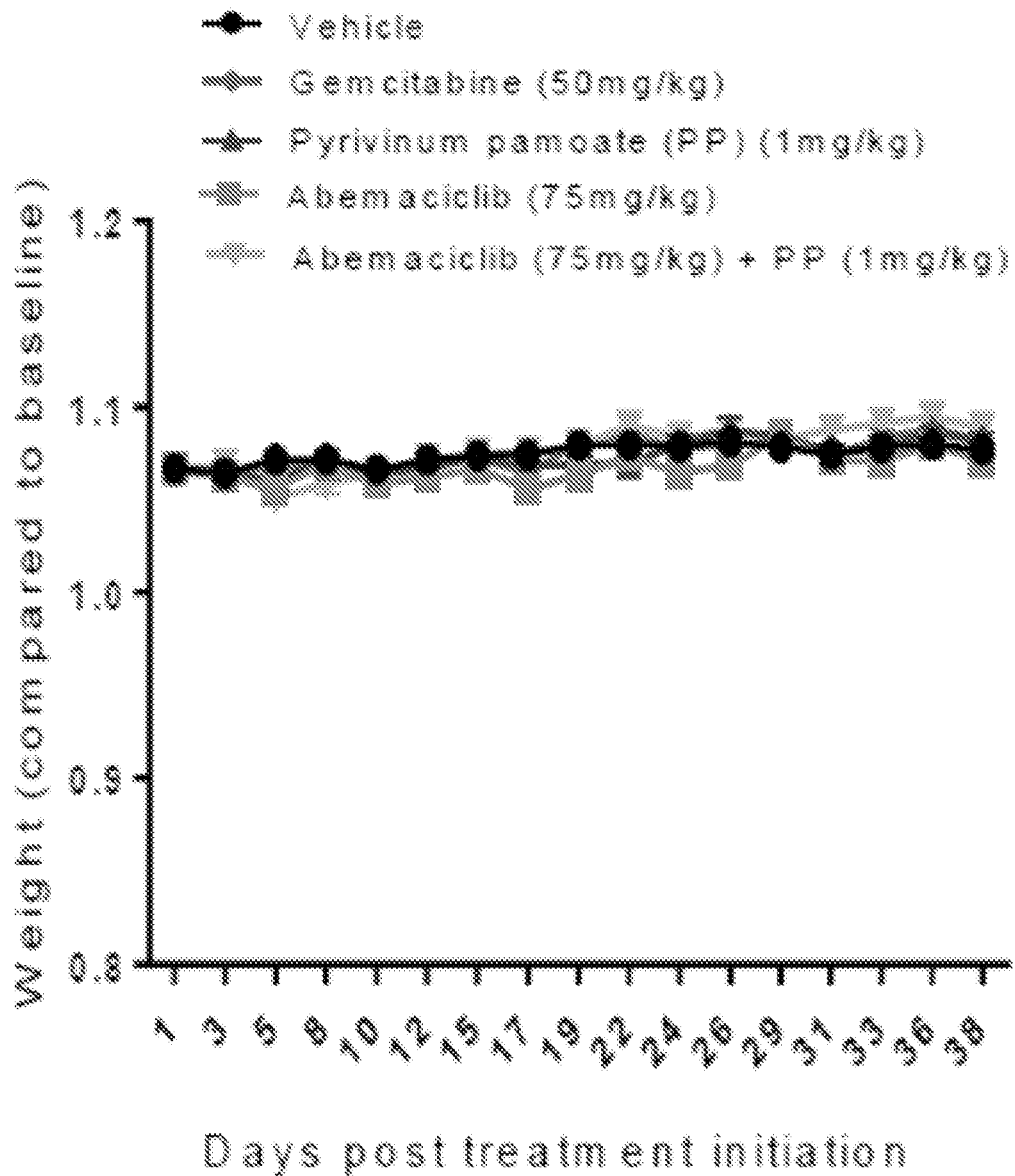

FIGS. 14A-14C shows that pyrvinium pamoate and ademaciclib are efficacious in in vivo models.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. All publications, patents, and patent documents referred to in this document are incorporated by reference herein in their entirety, as though individually incorporated by reference.

In the methods described herein, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Definitions

The term "about" as used herein can allow for a degree of variability in a value or range, for example, within 10%, within 5%, or within 1% of a stated value or of a stated limit of a range, and includes the exact stated value or range.

As used herein, the term "composition" or "pharmaceutical composition" refers to a mixture of at least one compound described herein with a pharmaceutically acceptable carrier. The pharmaceutical composition facilitates administration of the compound to a patient or subject. Multiple techniques of administering a compound exist in the art including, but not limited to, intravenous, oral, aerosol, parenteral, ophthalmic, pulmonary and topical administration.

A "disease" is a state of health of an animal wherein the animal cannot maintain homeostasis, and wherein if the disease is not ameliorated then the animal's health continues to deteriorate.

In contrast, a "disorder" in an animal is a state of health in which the animal is able to maintain homeostasis, but in which the animal's state of health is less favorable than it would be in the absence of the disorder. Left untreated, a disorder does not necessarily cause a further decrease in the animal's state of health.

As used herein, the terms "effective amount," "pharmaceutically effective amount" and "therapeutically effective amount" refer to a nontoxic but sufficient amount of an agent to provide the desired biological result. That result may be reduction and/or alleviation of the signs, symptoms, or causes of a disease, or any other desired alteration of a biological system. An appropriate therapeutic amount in any individual case may be determined by one of ordinary skill in the art using routine experimentation.

As used herein, the term "efficacy" refers to the maximal effect (Emax) achieved within an assay.

The term "independently selected from" as used herein refers to referenced groups being the same, different, or a mixture thereof, unless the context clearly indicates otherwise. Thus, under this definition, the phrase "$X^1$, $X^2$, and $X^3$ are independently selected from noble gases" would include the scenario where, for example, $X^1$, $X^2$, and $X^3$ are all the same, where $X^1$, $X^2$, and $X^3$ are all different, where $X^1$ and $X^2$ are the same but $X^3$ is different, and other analogous permutations.

As used herein, the term "pharmaceutically acceptable" refers to a material, such as a carrier or diluent, which does not abrogate the biological activity or properties of the compound, and is relatively non-toxic, i.e., the material may be administered to an individual without causing undesirable biological effects or interacting in a deleterious manner with any of the components of the composition in which it is contained.

As used herein, the language "pharmaceutically acceptable salt" refers to a salt of the administered compounds prepared from pharmaceutically acceptable non-toxic acids or bases, including inorganic acids or bases, organic acids or bases, solvates, hydrates, or clathrates thereof.

Suitable pharmaceutically acceptable acid addition salts may be prepared from an inorganic acid or from an organic acid. Examples of inorganic acids include hydrochloric, hydrobromic, hydriodic, nitric, carbonic, sulfuric (including sulfate and hydrogen sulfate), and phosphoric acids (including hydrogen phosphate and dihydrogen phosphate). Appropriate organic acids may be selected from aliphatic, cycloaliphatic, aromatic, araliphatic, heterocyclic, carboxylic and sulfonic classes of organic acids, examples of which include formic, acetic, pamoic, propionic, succinic, glycolic, gluconic, lactic, malic, tartaric, citric, ascorbic, glucuronic, maleic, malonic, saccharin, fumaric, pyruvic, aspartic, glutamic, benzoic, anthranilic, 4-hydroxybenzoic, phenylacetic, mandelic, embonic (pamoic), methanesulfonic, ethanesulfonic, benzenesulfonic, pantothenic, trifluoromethanesulfonic, 2-hydroxyethanesulfonic, p-toluenesulfonic, sulfanilic, cyclohexylaminosulfonic, stearic, alginic, β-hydroxybutyric, salicylic, galactaric and galacturonic acid.

Suitable pharmaceutically acceptable base addition salts of compounds described herein include, for example, ammonium salts, metallic salts including alkali metal, alkaline earth metal and transition metal salts such as, for example, calcium, magnesium, potassium, sodium and zinc salts. Pharmaceutically acceptable base addition salts also include organic salts made from basic amines such as, for example, N,N'-dibenzylethylene-diamine, chloroprocaine, choline, diethanolamine, ethylenediamine, meglumine (N-methylglucamine) and procaine. All of these salts may be prepared from the corresponding compound by reacting, for example, the appropriate acid or base with the compound.

As used herein, the term "pharmaceutically acceptable carrier" or "pharmaceutically acceptable excipient" means a pharmaceutically acceptable material, composition or carrier, such as a liquid or solid filler, stabilizer, dispersing agent, suspending agent, diluent, excipient, thickening agent, solvent or encapsulating material, involved in carrying or transporting a compound described herein within or to the patient such that it may perform its intended function. Typically, such constructs are carried or transported from one organ, or portion of the body, to another organ, or portion of the body. Each carrier must be "acceptable" in the sense of being compatible with the other ingredients of the formulation, including the compound(s) described herein, and not injurious to the patient. Some examples of materials that may serve as pharmaceutically acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; surface active agents; alginic acid; pyrogen-free water; isotonic saline; Ringer's solution; ethyl alcohol; phosphate buffer solutions; and other non-toxic compatible substances employed in pharmaceutical formulations. As used herein, "pharmaceutically acceptable carrier" also includes any and all coatings, antibacterial and antifungal agents, and absorption delaying agents, and the like that are compatible with the activity of the compound(s) described herein, and are physiologically acceptable to the patient. Supplementary active compounds may also be incorporated into the compositions. The "pharmaceutically acceptable carrier" may further include a pharmaceutically acceptable salt of the compound(s) described herein. Other additional ingredients that may be included in the pharmaceutical compositions used with the methods or compounds described herein are known in the art and described, for example in Remington's Pharmaceutical Sciences (Genaro, Ed., Mack Publishing Co., 1985, Easton, PA), which is incorporated herein by reference.

The terms "patient," "subject," or "individual" are used interchangeably herein, and refer to any animal, or cells thereof whether in vitro or in situ, amenable to the methods described herein. In a non-limiting embodiment, the patient, subject or individual is a human.

As used herein, the term "potency" refers to the dose needed to produce half the maximal response ($ED_{50}$).

The term "room temperature" as used herein refers to a temperature of about 15° C. to 28° C.

The term "standard temperature and pressure" as used herein refers to 20° C. and 101 kPa.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

A "therapeutic" treatment is a treatment administered to a subject who exhibits signs of pathology, for the purpose of diminishing, ameliorating, and/or eliminating those signs.

As used herein, the term "treatment" or "treating" is defined as the application or administration of a therapeutic agent, i.e., a compound or compounds as described herein (alone or in combination with another pharmaceutical agent), to a patient, or application or administration of a therapeutic agent to an isolated tissue or cell line from a patient (e.g., for diagnosis or ex vivo applications), who has a condition contemplated herein or a symptom of a condition contemplated herein, with the purpose to cure, heal, alleviate, relieve, alter, remedy, ameliorate, improve or affect a condition contemplated herein, or the symptoms of a condition contemplated herein. Such treatments may be specifically tailored or modified, based on knowledge obtained from the field of pharmacogenomics.

Oral Compositions of Pyrvinium Salts

In various embodiments, oral compositions of pyrvinium salts are provided. The pyrvinium salt can be any suitable pharmaceutically acceptable acid addition salt described herein. In some embodiments, the pyrvinium salt is selected from the group consisting of pyrvinium chloride (hydrochloric acid salt), pyrvinium acetate (acetic acid salt), and pyrvinium pamoate (pamoic acid salt). In certain embodiments, the pyrvinium salt is pyrvinium pamoate.

Pyrvinium pamoate is approved for use in humans in the treatment of pinworm infections. Previously, the oral bioavailability of unmodified pyrvinium pamoate was thought to be negligible. Described herein is a bioavailable oral formulation of pyrvinium pamoate that is cytotoxic to PDA cells, and that can be used in the treatment, amelioration, and/or prevention of pancreatic cancers. The compositions described herein are formulated to provide orally bioavailable doses of pyrvinium pamoate suitable for the treatment, amelioration, and/or prevention of pancreatic cancer.

Pyrvinium pamoate has the following structure:

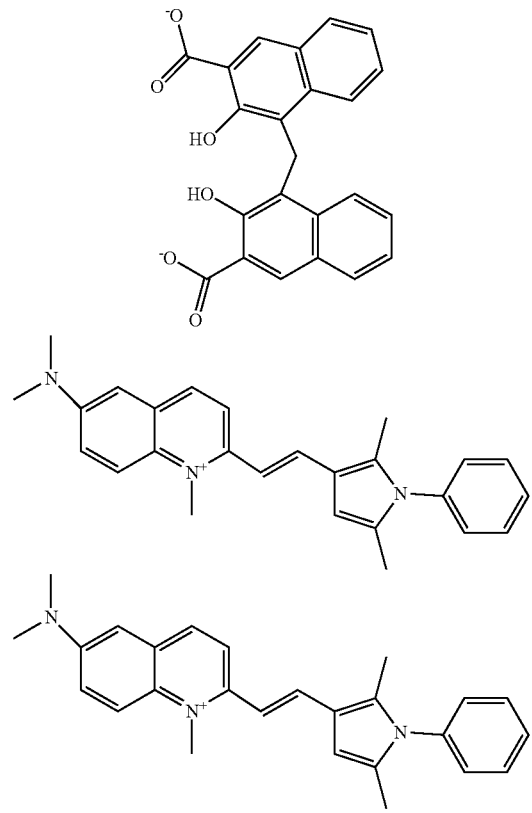

Previous pyrvinium pamoate formulations approved for human use included tablets and oral suspensions, however these formulations were not bioavailable. These approved pyrvinium pamoate formulations were suspensions sold under the name MOLEVAC® and contain the following excipients: benzoic acid, cherry flavor, methylcellulose, sodium hydroxide, sodium phosphate 12H$_2$O (dodecahydrate), Poloxamer 188, propylene glycol, Saccharin sodium 2H$_2$O (dihydrate), sucrose, hydrochloric acid 10%, sorbitan monolaurate (Ph. Eur.), and purified water. Each 5 mL of MOLEVAC® contains 1.15 g sucrose and 0.169 mmol (3.89 mg) sodium. As described in T. C. Smith et al., Clin Pharmacol Ther. 1976; 19 (6): 802-6, subjects were administered pyrvinium pamoate tablets or suspensions over the course of 8 days. The blood of the subjects was collected up to 4 days after each dose, and their urine was collected up to 96 hours after each dose. It was reported that the plasma specimens gave no indication of any absorption of pyrvinium pamoate. Similarly, the results of the urine assay showed that urine levels of pyrvinium were not significantly different from levels during the 24 hr prior to administration of pyrvinium pamoate. Thus, orally dosed pyrvinium pamoate was not bioavailable, since none of the drug was observed in either the blood or urine of patients. Since the prior approved clinical use of pyrvinium pamoate was for treatment of pinworms (*Enterobius vermicularis*) with the gastrointestinal system, its lack of bioavailability was unimportant, and even desirable.

In the present disclosure, it was unexpectedly discovered that, contrary to the literature discussed herein, it is possible to formulate pyrvinium salts to be orally bioavailable. Advantageously, the compositions described herein provide quantifiable levels of pyrvinium salts both in the plasma and in the pancreas for at least 4 hours after administration of an oral dose. In some embodiments, compositions of pyrvinium pamoate are orally bioavailable and provide quantifiable levels of pyrvinium pamoate both in the plasma and in the pancreas for at least 4 hours after administration of an oral dose.

In various embodiments, the pyrvinium salt is present in an amount of about 0.0001 to about 5% w/v, about 0.0005 to about 1% w/v, 0.001 to 5% w/v, about 0.01 to about 5% w/v, or about 0.001 to about 0.5% w/v. The pyrvinium salt, in certain embodiments, is present in an amount of about 0.0001, 0.005, 0.0075, 0.001, 0.0012, 0.0014, 0.0016, 0.0018, 0.01, 0.012, 0.014, 0.016, 0.018, 0.02, 0.03, 0.04, 0.05%, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.2, 1.4, 1.6, 1.8, 2, 2.2, 2.4, 2.6, 2.8, 3, 3.2, 3.4, 3.6, 3.8, 4, 4.2, 4.4, 4.6, 4.8, or 5% w/v. The pyrvinium salt can be present in a concentration ranging between any of the valued described herein.

In various embodiments, the composition contains a polar solvent that is soluble in or miscible with water. Non-limiting examples of polar solvents include DMSO, acetic acid, ethanol, and mixtures thereof. In one embodiment, the polar solvent is DMSO. In another embodiment, the polar solvent is acetic acid. The polar solvent or mixture thereof can be present in an amount of about 1% to about 30% v/v, or about 5% to about 15% v/v, or about 7% to about 12% v/v. The polar solvent or mixture thereof, in some embodiments, is present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% v/v. When more than one polar solvent is present in the composition, the ratio of the solvents can be any ratio that does not adversely affect the solubility of the pyrvinium salt by causing it to precipitate out of solution or otherwise not form or maintain a solution after 24 hours.

In various embodiments, the composition contains a nonionic emulsifier in an amount of about 1% to about 30% v/v, or about 5% to about 15% v/v, or about 7% to about 12% v/v. The nonionic emulsifier, in some embodiments, is present in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30% v/v. Suitable nonionic emulsifiers include, without limitation, polyethoxylated oils, such as polyethoxylated castor oil (e.g., CREMOPHOR® EL), fatty alcohol ethoxylates, fatty acid ethoxylates, EO-PO block co-polymers, sorbitan ester ethoxylates, lanolin alcohol ethoxylates, polyol esters, and lanolin alcohols. In various embodiments, only a single nonionic emulsifier is present in the composition. If acetic acid is present in the composition, in certain embodiments, the nonionic emulsifier can optionally be excluded (i.e., it is 0% v/v).

In various embodiments, the composition contains an aqueous vehicle in an amount of about 40% to about 98%, about 70% to about 90%, or about 75% to about 85% v/v. In some embodiments, the aqueous vehicle is present in an amount of about 40, 45, 50, 55, 60, 65, 70, 75, 80, 85, 90, 95, 96, 97, or 98% v/v. The aqueous vehicle can be any pharmaceutically acceptable aqueous vehicle, such as a 0.9% NaCl aqueous solution (saline) or deionized water. The composition described herein, in some embodiments, contains the following components: about 0.01 to 5% w/v pyrvinium salt; about 5 to 20% v/v of a polar solvent; about 0 to 15% v/v of a nonionic emulsifier; and about 60 to 90% v/v of an aqueous vehicle.

The composition, in various embodiments, is a solution. In some embodiments, the pyrvinium salt is the only active agent in the compositions described herein.

In some embodiments, the composition described herein is in the form of a suspension of particles containing a pyrvinium salt and having particles with an average size as measured by the largest dimension of the particle ranging from 0.001 μm to about 100 μm. In some embodiments, the particles have an average size of about 0.01 μm to about 100 μm, 0.1 μm to about 100 μm, 1 μm to about 100 μm, 0.01 μm to about 50 μm, 0.01 μm to about 20 μm, 1 μm to about 50 μm, or 1 μm to about 20 μm. In certain embodiments, the particles have an average size of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 μm. In various embodiments, at least or greater than 50%, 55%, 60%, 65%, 70%, 75%, 80%, 85%, 90%, 95%, or 98% of the particles have an average size of at least or greater than about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 μm.

Pharmacology of Oral Compositions of Pyrvinium Pamoate

In various embodiments, the composition provides an amount of pyrvinium pamoate ranging from about 0.01 mg/kg to about 200 mg/kg, or about 0.5 mg/kg to about 190 mg/kg, or about 0.75 mg/kg to about 180 mg/kg, or about 1 mg/kg to about 170 mg/kg, or about 1.5 mg/kg to about 160 mg/kg, or about 2 mg/kg to about 150 mg/kg, or about 2.5 mg/kg to about 140 mg/kg, or about 3 mg/kg to about 130 mg/kg, or about 3.5 mg/kg to about 120 mg/kg, or about 4 mg/kg to about 110 mg/kg, or about 4.5 mg/kg to about 100 mg/kg, or about 5 mg/kg to about 95 mg/kg, or about 5.5 mg/kg to about 90 mg/kg, or about 6 mg/kg to about 85 mg/kg, or about 6.5 mg/kg to about 80 mg/kg, or about 7 mg/kg to about 75 mg/kg, or about 7.5 mg/kg to about 70 mg/kg, or about 8 mg/kg to about 65 mg/kg, or about 8.5 mg/kg to about 60 mg/kg, or about 9 mg/kg to about 55 mg/kg or about 9.5 mg/kg to about 50 mg/kg, or about 10 mg/kg to about 45 mg/kg.

In various embodiments, the composition provides an amount of pyrvinium pamoate that is less than, equal to, or greater than about 0.01 mg/kg, 0.05 mg/kg, 0.1 mg/kg, 0.25 mg/kg, 0.5 mg/kg, 0.75 mg/kg, 1 mg/kg, 1.5 mg/kg, 2 mg/kg, 2.5 mg/kg, 3 mg/kg, 3.5 mg/kg, 4 mg/kg, 4.5 mg/kg, 5 mg/kg, 5.5 mg/kg, 6 mg/kg, 6.5 mg/kg, 7 mg/kg, 7.5 mg/kg, 8 mg/kg, 8.5 mg/kg, 9 mg/kg, 9.5 mg/kg, 10 mg/kg, 12 mg/kg, 14 mg/kg, 16 mg/kg, 18 mg/kg, 20 mg/kg, 25 mg/kg, 30 mg/kg, 35 mg/kg, 40 mg/kg, 45 mg/kg, 50 mg/kg, 55 mg/kg, 60 mg/kg, 65 mg/kg, 70 mg/kg, 75 mg/kg, 80 mg/kg, 85 mg/kg, 90 mg/kg, 100 mg/kg, 105 mg/kg, 110 mg/kg, 115 mg/kg, 120 mg/kg, 125 mg/kg, 130 mg/kg, 140 mg/kg, 145 mg/kg, 150 mg/kg, 155 mg/kg, 160 mg/kg, 170 mg/kg, 175 mg/kg, 180 mg/kg, 185 mg/kg, 190 mg/kg, 195 mg/kg, or 200 mg/kg.

In certain embodiments, the composition described herein results in a pyrvinium plasma concentration of about 1 ng/mL to about 3 ng/mL at about 1 hour after administration of the composition. In other embodiments, the composition described herein results in a pyrvinium plasma concentration of about 2 ng/mL to about 4 ng/mL at about 2 hours after administration of the composition. In other embodiments, the composition described herein results in a pyrvinium plasma concentration of about 1 ng/mL to about 2 ng/mL at about 4 hours after administration of the composition. In some embodiments, the composition results in a pyrvinium plasma concentration of about 1 ng/mL to about 8 ng/mL, about 1 ng/mL to about 7 ng/mL, about 1 ng/mL to about 6 ng/mL, about 1 ng/mL to about 5 ng/mL, about 1 ng/mL to about 4 ng/mL, about 1 ng/mL to about 3 ng/mL, or about 1 ng/mL to about 2 ng/mL, at up to about 5 hours after administration of the composition. In some embodiments, the composition results in a pyrvinium plasma concentration of about 1 ng/mL, 1.5 ng/mL, 2 ng/mL, 2.5 ng/mL, 3 ng/mL, 3.5 ng/mL, 4 ng/mL, 4.5 ng/mL, 5 ng/mL, 5.5 ng/mL, 6 ng/mL, 6.5 ng/mL, 7 ng/mL, 7.5 ng/mL, 8 ng/mL, 8.5 ng/mL, 9 ng/mL, 9.5 ng/mL, 10 ng/mL, 10.5 ng/mL, 11 ng/mL, 11.5 ng/mL, 12 ng/mL, 12.5 ng/mL, 13 ng/mL, 13.5 ng/mL, 14 ng/mL, 14.5 ng/mL, or about 15 ng/mL at up to about 1, 1.5, 2, 2.5, 3, 3.5, 4, 4.5, 5, 5.5, 6, 6.5, 7, 7.5, or 8 hours after administration of the composition.

In some embodiments, the composition described herein results in a pyrvinium concentration in the pancreas of about 5 ng/mL to about 10 ng/mL at about 2 hours after administration of the composition. In other embodiments, the composition described herein results in a pyrvinium concentration in the pancreas of about 5 ng/mL to about 10 ng/mL at about 4 hours after administration of the composition. In other embodiments, the composition described herein results in a pyrvinium concentration in the pancreas of about 10 ng/mL to about 15 ng/mL at about 6 hours after administration of the composition. In other embodiments, the composition described herein results in a pyrvinium concentration in the pancreas of about 1 ng/mL to about 5 ng/mL at about 8 hours after administration of the composition. In some embodiments, the composition results in a pyrvinium concentration in the pancreas of about 1 ng/mL to about 20 ng/mL, about 1 ng/mL to about 18 ng/mL, about 1 ng/mL to about 16 ng/mL, about 1 ng/mL to about 14 ng/mL, about 1 ng/mL to about 12 ng/mL, about 1 ng/mL to about 10 ng/mL, about 1 ng/mL to about 8 ng/mL, about 1 ng/mL to about 6 ng/mL, or about 1 ng/mL to about 4 ng/mL, at up to about 8 hours after administration of the composition. In some embodiments, the composition results in a pyrvinium concentration in the pancreas of about 1 ng/mL, 1.5 ng/mL, 2 ng/mL, 2.5 ng/mL, 3 ng/mL, 3.5 ng/mL, 4 ng/mL, 4.5 ng/mL, 5 ng/mL, 5.5 ng/mL, 6 ng/mL, 6.5 ng/mL, 7 ng/mL, 7.5 ng/mL, 8 ng/mL, 8.5 ng/mL, 9 ng/mL, 9.5 ng/mL, 10 ng/mL, 10.5 ng/mL, 11 ng/mL, 11.5 ng/mL, 12 ng/mL, 12.5 ng/mL, 13 ng/mL, 13.5 ng/mL, 14 ng/mL, 14.5 ng/mL, or about 15 ng/mL at up to about 1, 1.5, 2, 2.5, 3, 3.5, 4, 4.5, 5, 5.5, 6, 6.5, 7, 7.5, or 8 hours after administration of the composition.

Methods of Treating, Ameliorating, and/or Preventing Cancer

The disclosure includes a method of treating, ameliorating, and/or preventing cancer using the composition described herein. Examples of cancers that can be treated, ameliorated, and/or prevented using the compositions described herein include, but are not limited to: squamous cell cancer, lung cancer including small-cell lung cancer, non-small cell lung cancer, vulval cancer, thyroid cancer, lung cancer, cancer of the peritoneum, hepatocellular cancer, gastric or stomach cancer including gastrointestinal cancer, pancreatic cancer, glioblastoma, cervical cancer, ovarian cancer, liver cancer, bladder cancer, hepatoma, breast cancer, colon cancer, rectal cancer, colorectal cancer, endometrial or uterine carcinoma, salivary gland carcinoma, kidney or renal cancer, prostate cancer, hepatic carcinoma, anal carcinoma, penile carcinoma, and head and neck cancer. In various embodiments, the cancer is pancreatic cancer. Non-limiting examples of pancreatic cancer include pancreatic ductal adenocarcinoma (PDAC). Without being bound by theory, it is believed that the compositions described herein inhibit and/or reduce the function of the HuR protein.

HuR (ELAVL1) is an RNA binding protein that, upon exposure to a variety of intrinsic cancer related stressors, binds to a network of pro-survival mRNAs leading to an increase in their stability and translation. Consistent with its role as a chemoresistance factor, previously published data indicates that enhanced HuR cytoplasmic localization in patient samples is a biomarker for poor prognosis. HuR CRISPR knockout PDA cell lines have a xenograft lethal phenotype. DOX-inducible shRNA inhibition of HuR caused a 3.6-fold decrease in tumor volume and potentiated a PARP-inhibitor (olaparib) from 5.6-fold reduction alone to 9.3-fold reduction when combined with shHuR. HuR is also important for oxaliplatin resistance in PDA. Utilizing a tumor microarray (TMA) from resected patient samples of PDA, it was discovered that 79% (n=80) of patients were positive for cytoplasmic HuR, with little to no cytoplasmic localization detected in adjacent normal tissues. HuR is a driver of chemoresistance in PDA and thus a prime target for re-sensitizing PDA cells to current therapies. While several compounds have been investigated as HuR inhibitors, to date there are no clinically viable HuR inhibitors.

The efficacy of pyrvinium pamoate was determined in a panel of PDA cell lines.

TABLE 1

Inhibition of HuR binding to target mRNA VEGF and COX2 (PP = pyrvinium pamoate).

| Compound | VEGF Binding Inhibition $IC_{50}$ (nM) | COX2 Binding Inhibition $IC_{50}$ (nM) |
|---|---|---|
| PP | 202.6 to 415.8 | 206.8 to 452.9 |
| DHTS | 1509 to 2936 | 588.6 to 1094 |
| MS444 | 12.06 to 15.57 | 24.34 to 50.40 |
| AZA9 | 894.0 to 1526 | 419.5 to 963.5 |
| CMLD2 | 2017 to 4072 | 1007 to 1880 |
| Oxaliplatin | >20000 | >20000 |
| Gemcitabine | >20000 | >20000 |

TABLE 2

Inhibition of VEGF DNA binding to HuR (PP = pyrvinium pamoate).

| Compound | $IC_{50}$, n1 | $IC_{50}$, n2 | Max % I, n1 | Max % I, n2 | Mean $IC_{50}$ | Mean Max % I |
|---|---|---|---|---|---|---|
| PP | 187 | 118 | 87.2 | 86.5 | 149 | 86.8 |
| DHTS | 1068 | 2117 | 86.5 | 99.2 | 1504 | 92.9 |
| MS444 | 15 | 17 | 100.0 | 99.5 | 16 | 99.8 |
| Verteporfin | 167 | 124 | 77.0 | 72.4 | 144 | 74.7 |
| AZA9 | 1240 | 862 | 100.0 | 100.0 | 1034 | 100.0 |
| CMLD2 | 1284 | 1296 | 85.6 | 71.9 | 1290 | 78.7 |
| Oxaliplain | >20000 | >20000 | — | — | >20000 | — |
| Gemcitabine | >20000 | >20000 | — | — | >20000 | — |
| NC-3 | 5226 | 15528 | 79.9 | 100.0 | 9008 | 90.0 |
| Paclitaxel | 5050 | 5787 | 81.7 | 74.9 | 5406 | 78.3 |
| Dihydro-tashinone | 6095 | 8934 | 100.0 | 100.0 | 7379 | 100.0 |

TABLE 3

Inhibition of COX2 DNA binding to HuR (PP = pyrvinium pamoate).

| Compound | $IC_{50}$, n1 | $IC_{50}$, n2 | Max % I, n1 | Max % I, n2 | Mean $IC_{50}$ | Mean Max % I |
|---|---|---|---|---|---|---|
| PP | 340 | 115 | 88.8 | 89.8 | 198 | 89.3 |
| DHTS | 1079 | 332 | 100.0 | 88.1 | 599 | 94.0 |
| MS444 | 33 | 32 | 100.0 | 100.0 | 33 | 100.0 |
| Verteporfin | 28 | 30 | 92.9 | 92.4 | 29 | 92.7 |
| AZA9 | 684 | 684 | 100.0 | 100.0 | 684 | 100.0 |
| CMLD2 | 593 | 767 | 81.1 | 82.1 | 674 | 81.6 |
| Oxaliplain | >20000 | >20000 | 100.0 | 100.0 | >20000 | — |
| Gemcitabine | >20000 | >20000 | 100.0 | 100.0 | >20000 | — |
| NC-3 | 14877 | 12646 | 100.0 | 100.0 | 13716 | 100.0 |
| Paclitaxel | 2221 | 3910 | 83.4 | 84.1 | 2947 | 83.8 |
| Dihydro-tashinone | 4080 | 7342 | 100.0 | 100.0 | 5473 | 100.0 |

Figure 1:
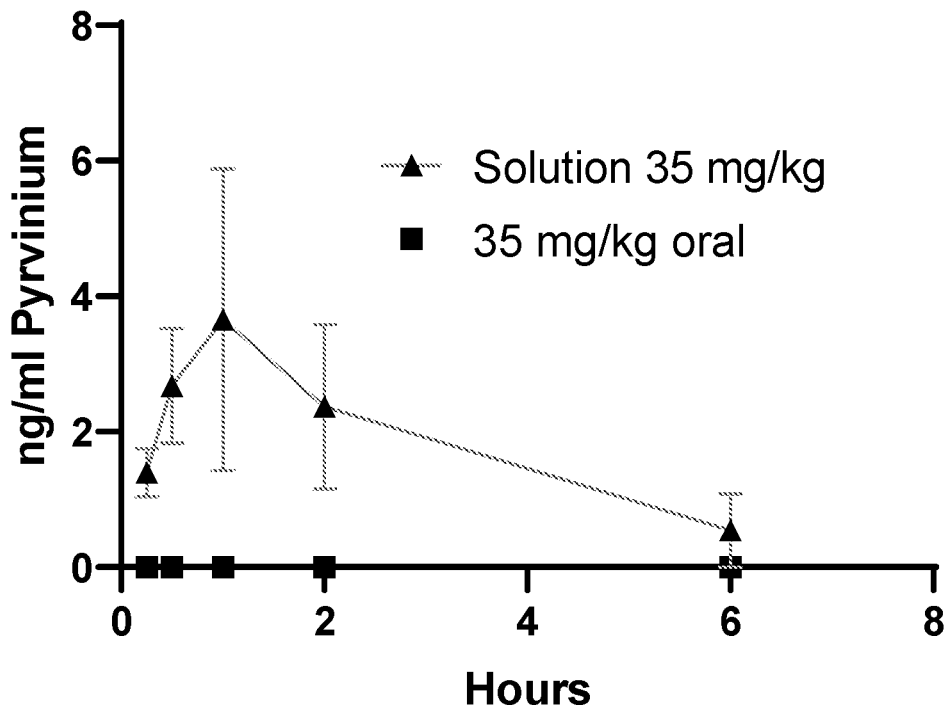
FIG. 1 is a graph of pyrvinium pamoate plasma concentration administered using an embodiment of an oral formulation described herein (triangles) and a previously used oral formulation (MOLEVAC®) (squares).
Figure 2:
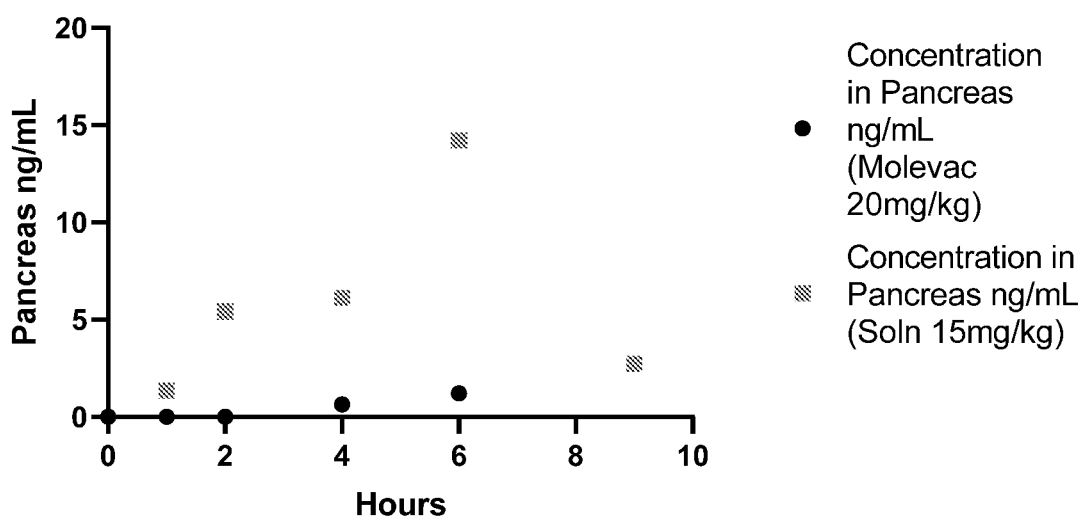
FIG. 2 is a graph of pyrvinium pamoate pancreas concentration administered using an embodiment of an oral formulation described herein (squares) and a previously used oral formulation (MOLEVAC®) (circles).
Figure 3:
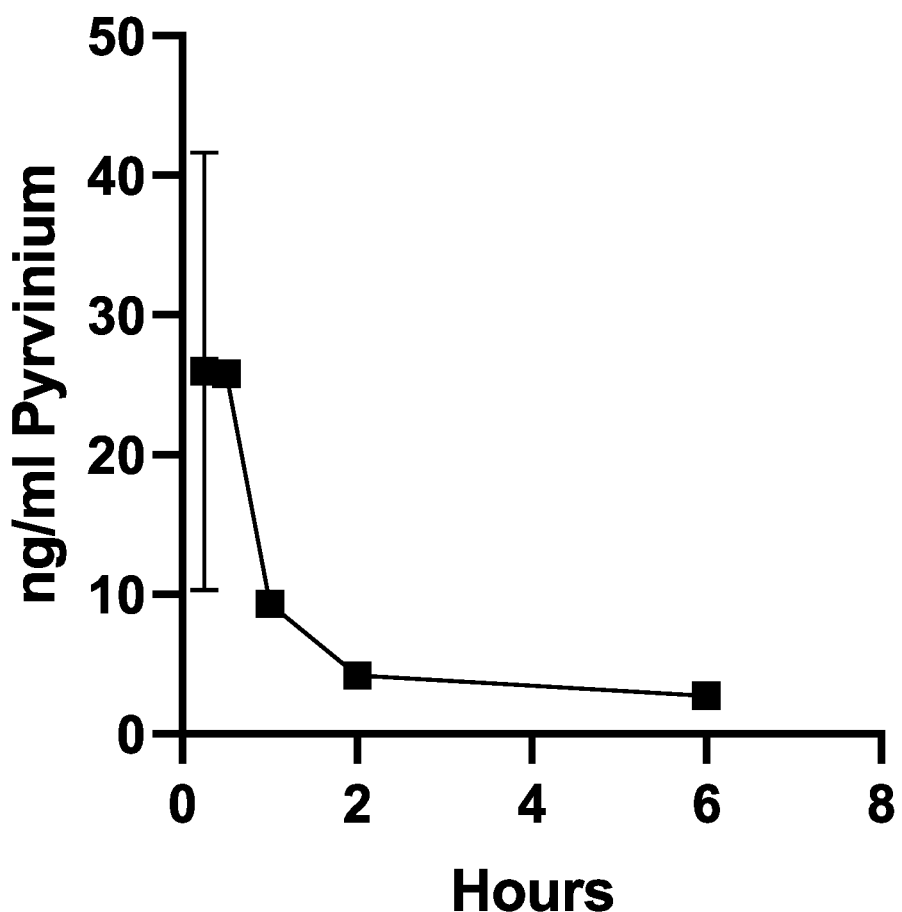
FIG. 3 is a graph showing pyrvinium pamoate plasma concentration after intravenous administration.
Figure 4A:
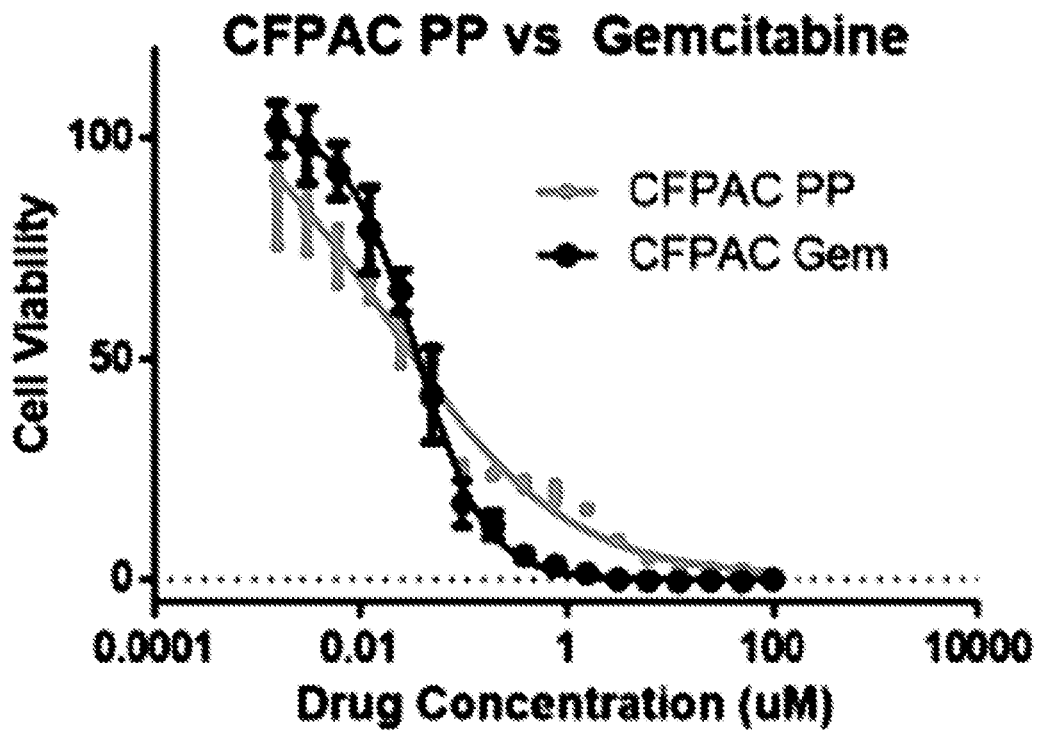
FIGS. 4A-4B show pyrvinium pamoate activity in vitro and in vivo.
Figure 4B:
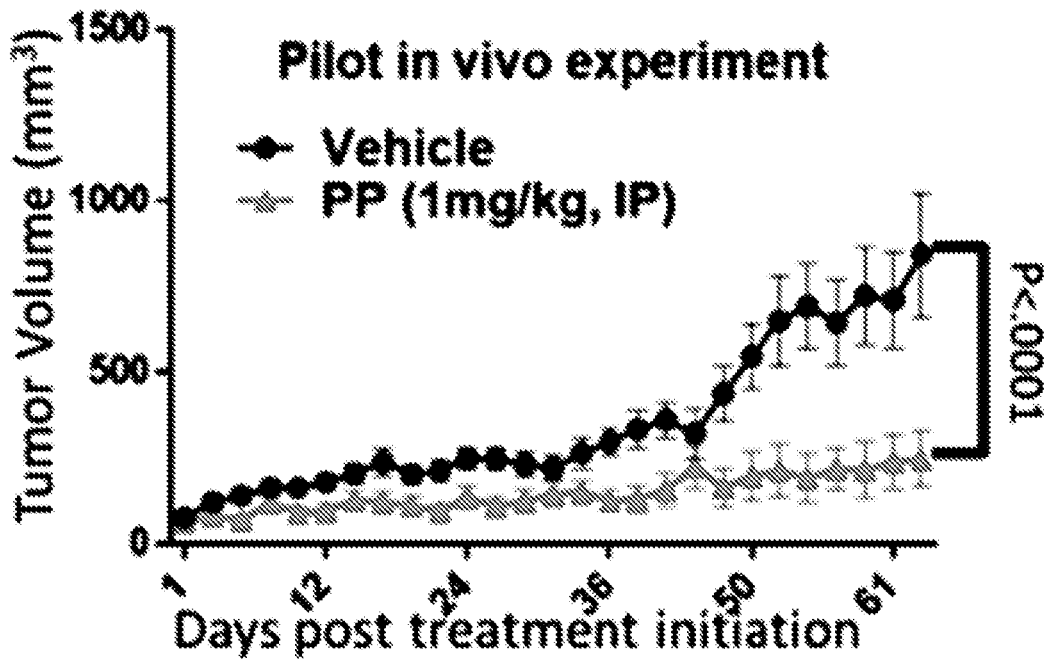
Figure 5A:
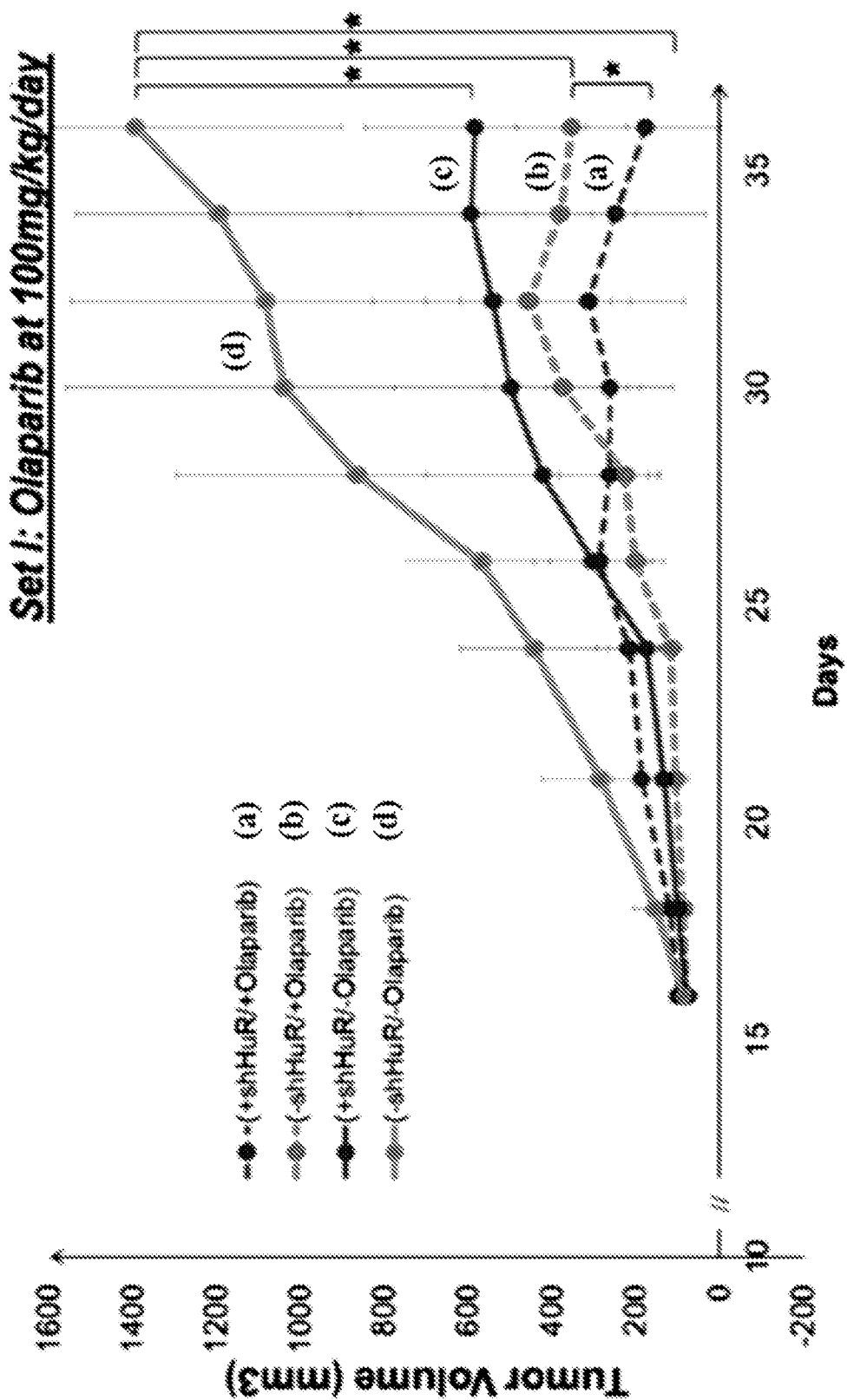
FIGS. 5A-5E illustrate the importance of HuR in pancreatic cancer (PDA).
Figure 5B:
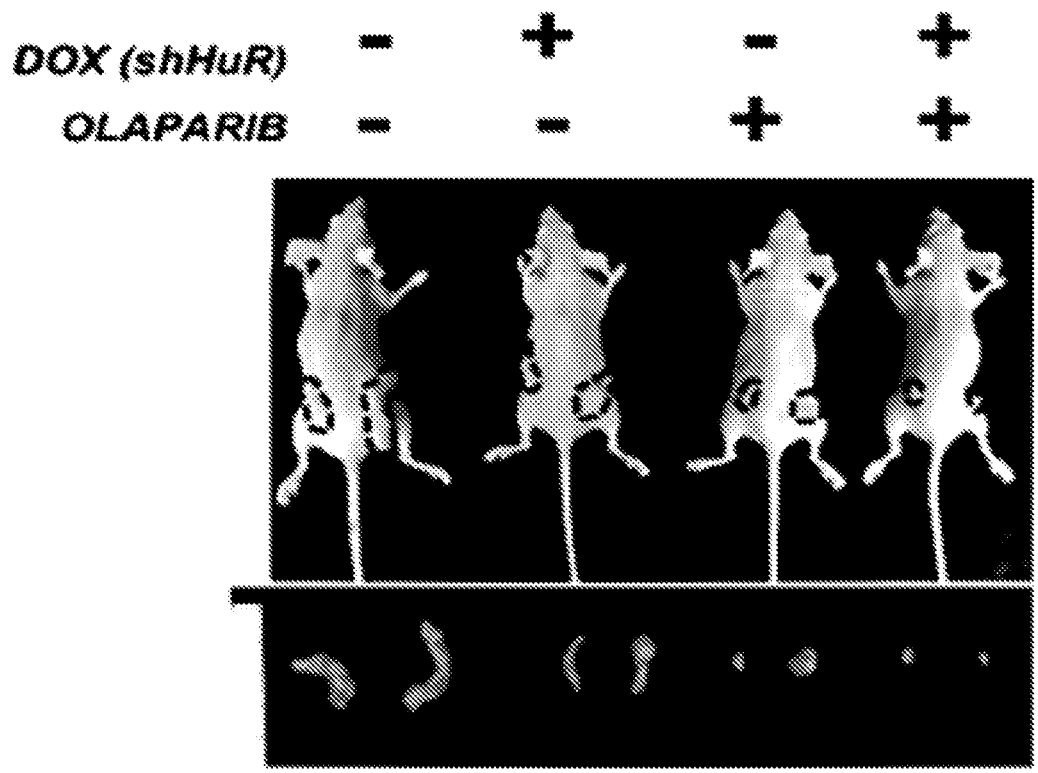
Figure 5C:
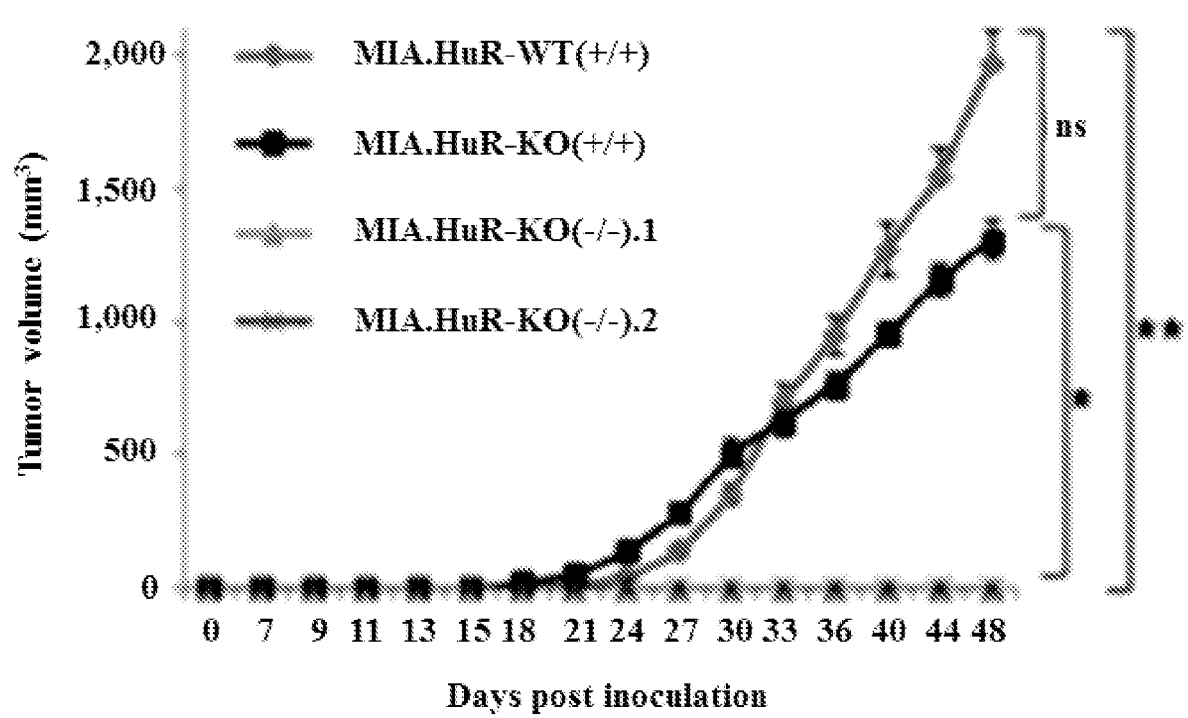
Figure 5D:
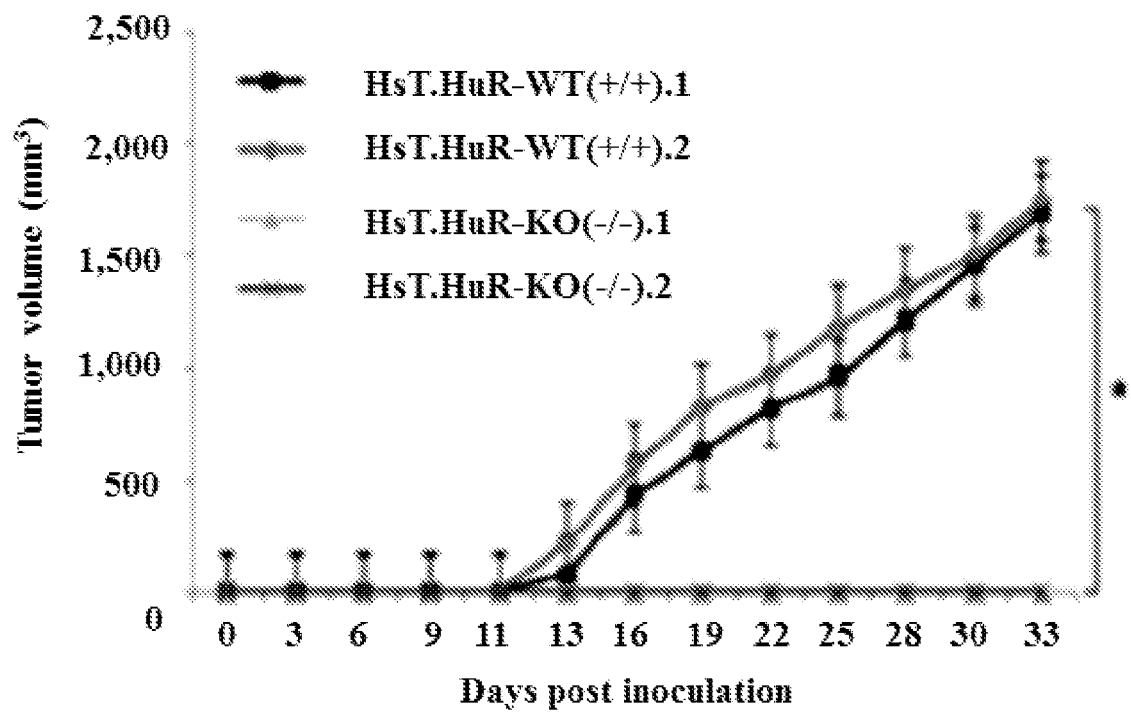
Figure 5E:
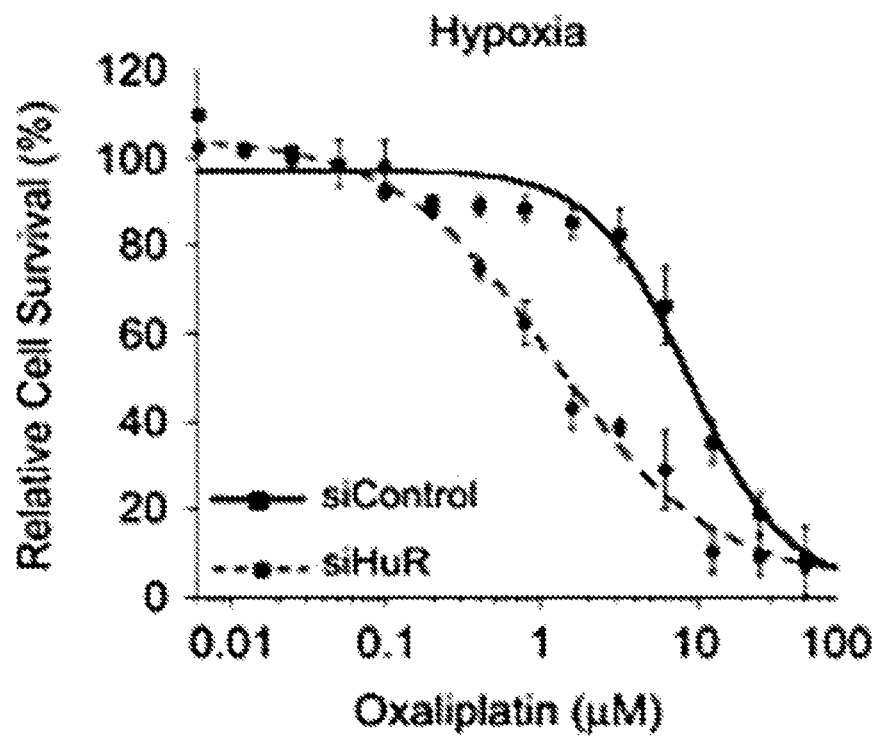
Figure 6:
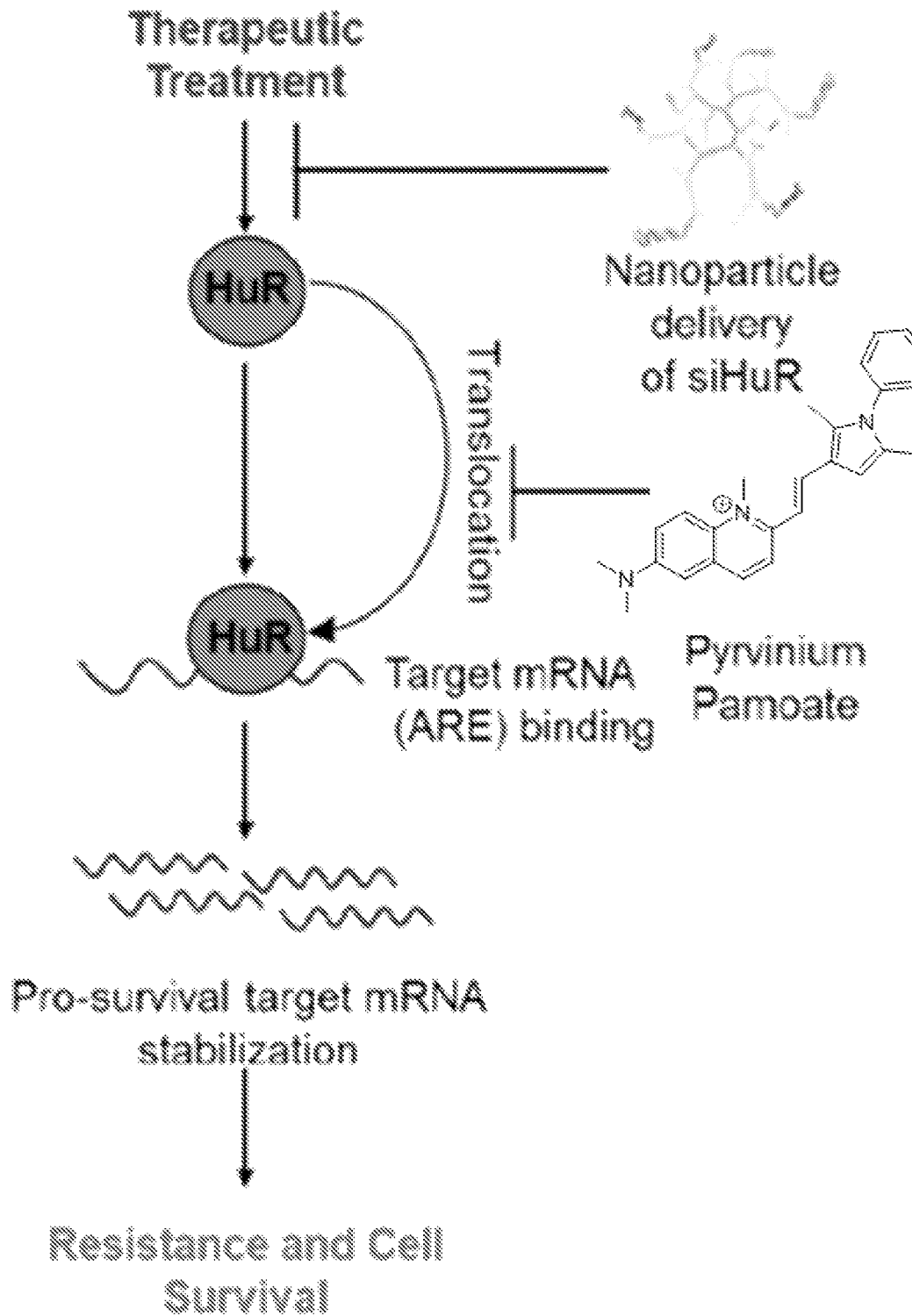
FIG. 6 shows a potential mechanism of action of HuR in PDA. HuR Activation Sequence: (i) therapeutics cause stress; (ii) HuR translocates to the cytoplasm; (iii) HuR binds ARE's in the 3'UTR of pro-survival targets; (iv) HuR stabilizes these pro-survival targets and increases protein translation; (v) Overall these pro-survival targets cause a resistance to therapeutics. Methods of inhibition (sequence)

In one de-identified PDX (patient-derived xenograft) cell lines, pyrvinium pamoate was once again effective at nanomolar concentrations (Table 2). Utilizing a more clinically relevant model, pyrvinium pamoate was tested in two separate 3D organoid lines from genetically engineered mouse models (GEMMs). KPC mice have both an activating KRAS mutation (KRAS is mutated in up to 90% of PDA) and a loss of P53 driven by a pancreas specific Cre promoter. The KTC organoid model is derived from a GEMM that has a driver KRAS mutation and greater than 2-fold overexpression of HuR, specifically in the pancreas. Pyrvinium pamoate was shown to be potent in both models, with low nanomolar IC50s (Table 2). Pyrvinium pamoate was tested in an in vivo experiment. Mice were injected with 4 million MIA-PaCa2 cells per flank, and when tumors reached 100 $mm^3$ they were treated with either vehicle or 1 mg/kg pyrvinium pamoate injected IP 3 times weekly. A significant decrease in tumor growth, and no changes in mouse weights was observed (FIG. 4B).

TABLE 4

PP Efficacy: Cell lines and organoids were treated with PP for 5 day viability assays (Pico Green); PP = pyrvinium pamoate.

| Cell Line | $IC_{50}$ (nM) |
|---|---|
| HS766T | 93 |
| MIA-PaCa2 | 40 |
| Panc-1 | 92 |
| CFPAC | 21 |
| PDX-X139 | 9 |
| KTC Organoids | 93 |
| KPC Organoids | 58 |

The methods described herein include administering to the subject a therapeutically effective amount of at least one compound described herein, which is optionally formulated in a pharmaceutical composition. In various embodiments, a therapeutically effective amount of at least one compound described herein present in a pharmaceutical composition is the only therapeutically active compound in a pharmaceutical composition. In certain embodiments, the method further comprises administering to the subject an additional therapeutic agent that treats, ameliorates, and/or prevents pancreatic cancer.

In certain embodiments, administering the compound(s) described herein to the subject allows for administering a lower dose of the additional therapeutic agent as compared to the dose of the additional therapeutic agent alone that is required to achieve similar results in treating, ameliorating, and/or preventing a pancreatic cancer in the subject. For example, in certain embodiments, the compound(s) described herein enhance(s) the activity of the additional therapeutic compound, thereby allowing for a lower dose of the additional therapeutic compound to provide the same effect.

In certain embodiments, the compound(s) described herein and the therapeutic agent are co-administered to the subject. In other embodiments, the compound(s) described herein and the therapeutic agent are coformulated and co-administered to the subject.

In certain embodiments, the subject is a mammal. In other embodiments, the mammal is a human.

Combination Therapies

The compounds useful within the methods described herein can be used in combination with one or more additional therapeutic agents useful for treating, ameliorating, and/or preventing pancreatic cancer. These additional therapeutic agents may comprise compounds that are commercially available or synthetically accessible to those skilled in the art. These additional therapeutic agents are known to treat, ameliorate, prevent, and/or reduce the symptoms of pancreatic cancer.

In certain embodiments, the compounds described herein can be used in combination with radiation therapy. In other embodiments, the combination of administration of the compounds described herein and application of radiation therapy is more effective in treating, ameliorating, and/or preventing pancreatic cancer than application of radiation therapy by itself. In yet other embodiments, the combination of administration of the compounds described herein and application of radiation therapy allows for use of lower amount of radiation therapy in treating, ameliorating, and/or preventing the subject.

In some embodiments, the additional therapeutic agent is at least one agent selected from the group consisting of oxaliplatin, irinotecan, 5-FU, leucovirin, paclitaxel, and a PARP inhibitor.

In various embodiments, a synergistic effect is observed when a compound as described herein is administered with one or more additional therapeutic agents or compounds. A synergistic effect may be calculated, for example, using suitable methods such as, for example, the Sigmoid-$E_{max}$ equation (Holford & Scheiner, 1981, Clin. Pharmacokinet. 6:429-453), the equation of Loewe additivity (Loewe & Muischnek, 1926, Arch. Exp. Pathol Pharmacol. 114:313-326) and the median-effect equation (Chou & Talalay, 1984, Adv. Enzyme Regul. 22:27-55). Each equation referred to above may be applied to experimental data to generate a corresponding graph to aid in assessing the effects of the drug combination. The corresponding graphs associated with the equations referred to above are the concentration-effect curve, isobologram curve and combination index curve, respectively.

Administration/Dosage/Formulations

The regimen of administration may affect what constitutes an effective amount. The therapeutic formulations may be administered to the subject either prior to or after the onset of a pancreatic cancer. Further, several divided dosages, as well as staggered dosages may be administered daily or sequentially, or the dose may be continuously infused, or may be a bolus injection. Further, the dosages of the therapeutic formulations may be proportionally increased or decreased as indicated by the exigencies of the therapeutic or prophylactic situation.

Administration of the compositions described herein to a patient, preferably a mammal, more preferably a human, may be carried out using known procedures, at dosages and for periods of time effective to treat, ameliorate, and/or prevent a pancreatic cancer in the patient. An effective amount of the therapeutic compound necessary to achieve a therapeutic effect may vary according to factors such as the state of the disease or disorder in the patient; the age, sex, and weight of the patient; and the ability of the therapeutic compound to treat, ameliorate, and/or prevent a pancreatic cancer in the patient. Dosage regimens may be adjusted to provide the optimum therapeutic response. For example, several divided doses may be administered daily or the dose may be proportionally reduced as indicated by the exigencies of the therapeutic situation. A non-limiting example of an effective dose range for a therapeutic compound described herein is from about 1 and 5,000 mg/kg of body weight/per day. One of ordinary skill in the art would be able to study the relevant factors and make the determination regarding the effective amount of the therapeutic compound without undue experimentation.

Actual dosage levels of the active ingredients in the pharmaceutical compositions described herein may be varied so as to obtain an amount of the active ingredient that is effective to achieve the desired therapeutic response for a particular patient, composition, and mode of administration, without being toxic to the patient.

In particular, the selected dosage level depends upon a variety of factors including the activity of the particular compound employed, the time of administration, the rate of excretion of the compound, the duration of the treatment, other drugs, compounds or materials used in combination with the compound, the age, sex, weight, condition, general health and prior medical history of the patient being treated, and like factors well, known in the medical arts.

A medical doctor, e.g., physician or veterinarian, having ordinary skill in the art may readily determine and prescribe the effective amount of the pharmaceutical composition required. For example, the physician or veterinarian could start doses of the compounds described herein employed in the pharmaceutical composition at levels lower than that required in order to achieve the desired therapeutic effect and gradually increase the dosage until the desired effect is achieved.

In particular embodiments, it is especially advantageous to formulate the compound in dosage unit form for ease of administration and uniformity of dosage. Dosage unit form as used herein refers to physically discrete units suited as unitary dosages for the patients to be treated; each unit containing a predetermined quantity of therapeutic compound calculated to produce the desired therapeutic effect in association with the required pharmaceutical vehicle. The dosage unit forms of the compound(s) described herein are dictated by and directly dependent on (a) the unique characteristics of the therapeutic compound and the particular therapeutic effect to be achieved, and (b) the limitations inherent in the art of compounding/formulating such a therapeutic compound.

In certain embodiments, the compositions described herein are formulated using one or more pharmaceutically acceptable excipients or carriers. In certain embodiments, the pharmaceutical compositions described herein comprise a therapeutically effective amount of a compound described herein and a pharmaceutically acceptable carrier.

The carrier may be a solvent or dispersion medium containing, for example, water, ethanol, polyol (for example, glycerol, propylene glycol, and liquid polyethylene glycol, and the like), suitable mixtures thereof, and vegetable oils. The proper fluidity may be maintained, for example, by the use of a coating such as lecithin, by the maintenance of the required particle size in the case of dispersion and by the use of surfactants. Prevention of the action of microorganisms may be achieved by various antibacterial and antifungal agents, for example, parabens, chlorobutanol, phenol, ascorbic acid, thimerosal, and the like. In many cases, it is preferable to include isotonic agents, for example, sugars, sodium chloride, or polyalcohols such as mannitol and sorbitol, in the composition. Prolonged absorption of the injectable compositions may be brought about by including in the composition an agent which delays absorption, for example, aluminum monostearate or gelatin.

In certain embodiments, the compositions described herein are administered to the patient in dosages that range from one to five times per day or more. In other embodiments, the compositions described herein are administered to the patient in range of dosages that include, but are not limited to, once every day, every two, days, every three days to once a week, and once every two weeks. It is readily apparent to one skilled in the art that the frequency of administration of the various combination compositions described herein varies from individual to individual depending on many factors including, but not limited to, age, disease or disorder to be treated, gender, overall health, and other factors. Thus, administration of the compounds and compositions described herein should not be construed to be limited to any particular dosage regime and the precise dosage and composition to be administered to any patient is determined by the attending physician taking all other factors about the patient into account.

The compound(s) described herein for administration may be in the range of from about 1 μg to about 10,000 mg, about 20 μg to about 9,500 mg, about 40 μg to about 9,000 mg, about 75 μg to about 8,500 mg, about 150 μg to about 7,500 mg, about 200 μg to about 7,000 mg, about 350 μg to about 6,000 mg, about 500 μg to about 5,000 mg, about 750 μg to about 4,000 mg, about 1 mg to about 3,000 mg, about 10 mg to about 2,500 mg, about 20 mg to about 2,000 mg, about 25 mg to about 1,500 mg, about 30 mg to about 1,000 mg, about 40 mg to about 900 mg, about 50 mg to about 800 mg, about 60 mg to about 750 mg, about 70 mg to about 600 mg, about 80 mg to about 500 mg, and any and all whole or partial increments therebetween.

In some embodiments, the dose of a compound described herein is from about 1 mg and about 2,500 mg. In some embodiments, a dose of a compound described herein used in compositions described herein is less than about 10,000 mg, or less than about 8,000 mg, or less than about 6,000 mg, or less than about 5,000 mg, or less than about 3,000 mg, or less than about 2,000 mg, or less than about 1,000 mg, or less than about 500 mg, or less than about 200 mg, or less than about 50 mg. Similarly, in some embodiments, a dose of a second compound as described herein is less than about 1,000 mg, or less than about 800 mg, or less than about 600 mg, or less than about 500 mg, or less than about 400 mg, or less than about 300 mg, or less than about 200 mg, or less than about 100 mg, or less than about 50 mg, or less than about 40 mg, or less than about 30 mg, or less than about 25 mg, or less than about 20 mg, or less than about 15 mg, or less than about 10 mg, or less than about 5 mg, or less than about 2 mg, or less than about 1 mg, or less than about 0.5 mg, and any and all whole or partial increments thereof.

In certain embodiments, a composition as described herein is a packaged pharmaceutical composition comprising a container holding a therapeutically effective amount of a compound described herein, alone or in combination with a second pharmaceutical agent; and instructions for using the compound to treat, prevent, and/or reduce one or more symptoms of pancreatic cancer in a patient.

Formulations may be employed in admixtures with conventional excipients, i.e., pharmaceutically acceptable organic or inorganic carrier substances suitable for oral, parenteral, nasal, intravenous, subcutaneous, enteral, or any other suitable mode of administration, known to the art. The pharmaceutical preparations may be sterilized and if desired mixed with auxiliary agents, e.g., lubricants, preservatives, stabilizers, wetting agents, emulsifiers, salts for influencing osmotic pressure buffers, coloring, flavoring and/or aromatic substances and the like provided that the presence of these auxiliary agents does not adversely affect the solubility or bioavailability of the pyrvinium salt composition.

Routes of administration of any of the compositions described herein include oral, nasal, rectal, intravaginal, parenteral, buccal, sublingual or topical. The compounds for use in the compositions described herein can be formulated for administration by any suitable route, such as for oral or parenteral, for example, transdermal, transmucosal (e.g., sublingual, lingual, (trans)buccal, (trans)urethral, vaginal (e.g., trans- and perivaginally), (intra)nasal and (trans)rectal), intravesical, intrapulmonary, intraduodenal, intragastrical, intrathecal, subcutaneous, intramuscular, intradermal, intra-arterial, intravenous, intrabronchial, inhalation, and topical administration.

Suitable compositions and dosage forms include, for example, tablets, capsules, caplets, pills, gel caps, troches, dispersions, suspensions, solutions, syrups, granules, beads, transdermal patches, gels, powders, pellets, magmas, lozenges, creams, pastes, plasters, lotions, discs, suppositories, liquid sprays for nasal or oral administration, dry powder or aerosolized formulations for inhalation, compositions and formulations for intravesical administration and the like. It should be understood that the formulations and compositions described herein are not limited to the particular formulations and compositions that are described herein.

Oral Administration

For oral application, particularly suitable are tablets, dragees, liquids, drops, suppositories, or capsules, caplets and gelcaps. The compositions intended for oral use may be prepared according to any method known in the art and such compositions may contain one or more agents selected from the group consisting of inert, non-toxic pharmaceutically excipients that are suitable for the manufacture of tablets. Such excipients include, for example an inert diluent such as lactose; granulating and disintegrating agents such as cornstarch; binding agents such as starch; and lubricating agents such as magnesium stearate. The tablets may be uncoated or they may be coated by known techniques for elegance or to delay the release of the active ingredients. Formulations for oral use may also be presented as hard gelatin capsules wherein the active ingredient is mixed with an inert diluent.

For oral administration, the compound(s) described herein can be in the form of tablets or capsules prepared by conventional means with pharmaceutically acceptable excipients such as binding agents (e.g., polyvinylpyrrolidone, hydroxypropylcellulose or hydroxypropyl methylcellulose); fillers (e.g., cornstarch, lactose, microcrystalline cellulose or calcium phosphate); lubricants (e.g., magnesium stearate, talc, or silica); disintegrates (e.g., sodium starch glycollate); or wetting agents (e.g., sodium lauryl sulphate). If desired, the tablets may be coated using suitable methods and coating materials such as OPADRY™ film coating systems available from Colorcon, West Point, Pa. (e.g., OPADRY™ OY Type, OYC Type, Organic Enteric OY-P Type, Aqueous Enteric OY-A Type, OY-PM Type and OPADRY™ White, 32K18400). OPADRY™ film coating systems include polymers, plasticizers, and pigments in a dry concentrate. Liquid preparation for oral administration may be in the form of solutions, syrups or suspensions. The liquid preparations may be prepared by conventional means with pharmaceutically acceptable additives such as suspending agents (e.g., sorbitol syrup, methyl cellulose or hydrogenated edible fats); emulsifying agent (e.g., lecithin or acacia); non-aqueous vehicles (e.g., almond oil, oily esters or ethyl alcohol); and preservatives (e.g., methyl or propyl p-hydroxy benzoates or sorbic acid).

Compositions as described herein can be prepared, packaged, or sold in a formulation suitable for oral or buccal administration. A tablet that includes a compound as described herein can, for example, be made by compressing or molding the active ingredient, optionally with one or more additional ingredients. Compressed tablets may be prepared by compressing, in a suitable device, the active ingredient in a free-flowing form such as a powder or granular preparation, optionally mixed with one or more of a binder, a lubricant, an excipient, a surface active agent, and a dispersing agent. Molded tablets may be made by molding, in a suitable device, a mixture of the active ingredient, a pharmaceutically acceptable carrier, and at least sufficient liquid to moisten the mixture. Pharmaceutically acceptable excipients used in the manufacture of tablets include, but are not limited to, inert diluents, granulating and disintegrating agents, dispersing agents, surface-active agents, disintegrating agents, binding agents, and lubricating agents.

Suitable dispersing agents include, but are not limited to, potato starch, sodium starch glycollate, poloxamer 407, or poloxamer 188. One or more dispersing agents can each be individually present in the composition in an amount of about 0.01% w/w to about 90% w/w relative to weight of the dosage form. One or more dispersing agents can each be individually present in the composition in an amount of at least, greater than, or less than about 0.01%, 0.05%, 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, or 90% w/w relative to weight of the dosage form.

Surface-active agents (surfactants) include cationic, anionic, or non-ionic surfactants, or combinations thereof. Suitable surfactants include, but are not limited to, behentrimonium chloride, benzalkonium chloride, benzethonium chloride, benzododecinium bromide, carbethopendecinium bromide, cetalkonium chloride, cetrimonium bromide, cetrimonium chloride, cetylpyridine chloride, didecyldimethylammonium chloride, dimethyldioctadecylammonium bromide, dimethyldioctadecylammonium chloride, domiphen bromide, lauryl methyl gluceth-10 hydroxypropyl dimonium chloride, tetramethylammonium hydroxide, thonzonium bromide, stearalkonium chloride, octenidine dihydrochloride, olaflur, N-oleyl-1,3-propanediamine, 2-acrylamido-2-methylpropane sulfonic acid, alkylbenzene sulfonates, ammonium lauryl sulfate, ammonium perfluorononanoate, docusate, disodium cocoamphodiacetate, magnesium laureth sulfate, perfluorobutanesulfonic acid, perfluorononanoic acid, perfluorooctanesulfonic acid, perfluorooctanoic acid, potassium lauryl sulfate, sodium alkyl sulfate, sodium dodecyl sulfate, sodium laurate, sodium laureth sulfate, sodium lauroyl sarcosinate, sodium myreth sulfate, sodium nonanoyloxybenzenesulfonate, sodium pareth sulfate, sodium stearate, sodium sulfosuccinate esters, cetomacrogol 1000, cetostearyl alcohol, cetyl alcohol, cocamide diethanolamine, cocamide monoethanolamine, decyl glucoside, decyl polyglucose, glycerol monostearate, octylphenoxypolyethoxyethanol CA-630, isoceteth-20, lauryl glucoside, octylphenoxypolyethoxyethanol P-40, Nonoxynol-9, Nonoxynols, nonyl phenoxypolyethoxylethanol (NP-40), octaethylene glycol monododecyl ether, N-octyl beta-D-thioglucopyranoside, octyl glucoside, oleyl alcohol, PEG-10 sunflower glycerides, pentaethylene glycol monododecyl ether, polidocanol, poloxamer, poloxamer 407, polyethoxylated tallow amine, polyglycerol polyricinoleate, polysorbate, polysorbate 20, polysorbate 80, sorbitan, sorbitan monolaurate, sorbitan monostearate, sorbitan tristearate, stearyl alcohol, surfactin, Triton X-100, and Tween 80. One or more surfactants can each be individually present in the composition in an amount of about 0.01% w/w to about 90% w/w relative to weight of the dosage form. One or more surfactants can each be individually present in the composition in an amount of at least, greater than, or less than about 0.01%, 0.05%, 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, or 90% w/w relative to weight of the dosage form.

Suitable diluents include, but are not limited to, calcium carbonate, magnesium carbonate, magnesium oxide, sodium carbonate, lactose, microcrystalline cellulose, calcium phosphate, calcium hydrogen phosphate, and sodium phosphate, Cellactose® 80 (75% α-lactose monohydrate and 25% cellulose powder), mannitol, pre-gelatinized starch, starch, sucrose, sodium chloride, talc, anhydrous lactose, and granulated lactose. One or more diluents can each be individually present in the composition in an amount of about 0.01% w/w to about 90% w/w relative to weight of the dosage form. One or more diluents can each be individually present in the composition in an amount of at least, greater than, or less than about 0.01%, 0.05%, 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, or 90% w/w relative to weight of the dosage form.

Suitable granulating and disintegrating agents include, but are not limited to, sucrose, copovidone, corn starch, microcrystalline cellulose, methyl cellulose, sodium starch glycollate, pregelatinized starch, povidone, sodium carboxy methyl cellulose, sodium alginate, citric acid, croscarmellose sodium, cellulose, carboxymethylcellulose calcium, colloidal silicone dioxide, crosspovidone and alginic acid. One or more granulating or disintegrating agents can each be individually present in the composition in an amount of about 0.01% w/w to about 90% w/w relative to weight of the dosage form. One or more granulating or disintegrating agents can each be individually present in the composition in an amount of at least, greater than, or less than about 0.01%, 0.05%, 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, or 90% w/w relative to weight of the dosage form.

Suitable binding agents include, but are not limited to, gelatin, acacia, pre-gelatinized maize starch, polyvinylpyrrolidone, anhydrous lactose, lactose monohydrate, hydroxypropyl methylcellulose, methylcellulose, povidone, polyacrylamides, sucrose, dextrose, maltose, gelatin, polyethylene glycol. One or more binding agents can each be individually present in the composition in an amount of about 0.01% w/w to about 90% w/w relative to weight of the dosage form. One or more binding agents can each be individually present in the composition in an amount of at least, greater than, or less than about 0.01%, 0.05%, 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, or 90% w/w relative to weight of the dosage form.

Suitable lubricating agents include, but are not limited to, magnesium stearate, calcium stearate, hydrogenated castor oil, glyceryl monostearate, glyceryl behenate, mineral oil, polyethylene glycol, poloxamer 407, poloxamer 188, sodium laureth sulfate, sodium benzoate, stearic acid, sodium stearyl fumarate, silica, and talc. One or more lubricating agents can each be individually present in the composition in an amount of about 0.01% w/w to about 90% w/w relative to weight of the dosage form. One or more lubricating agents can each be individually present in the composition in an amount of at least, greater than, or less than about 0.01%, 0.05%, 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, or 90% w/w relative to weight of the dosage form.

Tablets can be non-coated or they may be coated using known methods to achieve delayed disintegration in the gastrointestinal tract of a subject, thereby providing sustained release and absorption of the active ingredient. By way of example, a material such as glyceryl monostearate or glyceryl distearate may be used to coat tablets. Further by way of example, tablets may be coated using methods described in U.S. Pat. Nos. 4,256,108; 4,160,452; and 4,265,874 to form osmotically controlled release tablets. Tablets may further comprise a sweetening agent, a flavoring agent, a coloring agent, a preservative, or some combination of these in order to provide for pharmaceutically elegant and palatable preparation.

Tablets can also be enterically coated such that the coating begins to dissolve at a certain pH, such as at about pH 5.0 to about pH 7.5, thereby releasing a compound as described herein. The coating can contain, for example, EUDRAGIT® L, S, FS, and/or E polymers with acidic or alkaline groups to allow release of a compound as described herein in a particular location, including in any desired section(s) of the intestine. The coating can also contain, for example, EUDRAGIT® RL and/or RS polymers with cationic or neutral groups to allow for time controlled release of a compound as described herein by pH-independent swelling. EUDRAGIT® coatings are polymers that can be combined to target releases profiles including immediate, delayed, sustained, pulsatile, accelerated, and zero order release.

Parenteral Administration

For parenteral administration, the compounds as described herein may be formulated for injection or infusion, for example, intravenous, intramuscular or subcutaneous injection or infusion, or for administration in a bolus dose and/or continuous infusion. Suspensions, solutions or emulsions in an oily or aqueous vehicle, optionally containing other formulatory agents such as suspending, stabilizing and/or dispersing agents may be used.

Sterile injectable forms of the compositions described herein may be aqueous or oleaginous suspension. These suspensions may be formulated according to techniques known in the art using suitable dispersing or wetting agents and suspending agents. The sterile injectable preparation may also be a sterile injectable solution or suspension in a non-toxic parenterally-acceptable diluent or solvent, for example as a solution in 1, 3-butanediol. Among the acceptable vehicles and solvents that may be employed are water, Ringer's solution and isotonic sodium chloride solution. Sterile, fixed oils are conventionally employed as a solvent or suspending medium. For this purpose, any bland fixed oil may be employed including synthetic mono- or di-glycerides. Fatty acids, such as oleic acid and its glyceride derivatives are useful in the preparation of injectables, as are natural pharmaceutically acceptable oils, such as olive oil or castor oil, especially in their polyoxyethylated versions. These oil solutions or suspensions may also contain a long-chain alcohol diluent or dispersant, such as Ph. Helv or similar alcohol.

Additional Administration Forms

Additional dosage forms suitable for use with the compound(s) and compositions described herein include dosage forms as described in U.S. Pat. Nos. 6,340,475; 6,488,962; 6,451,808; 5,972,389; 5,582,837; and 5,007,790. Additional dosage forms suitable for use with the compound(s) and compositions described herein also include dosage forms as described in U.S. Patent Applications Nos. 20030147952; 20030104062; 20030104053; 20030044466; 20030039688; and 20020051820. Additional dosage forms suitable for use with the compound(s) and compositions described herein also include dosage forms as described in PCT Applications Nos. WO 03/35041; WO 03/35040; WO 03/35029; WO 03/35177; WO 03/35039; WO 02/96404; WO 02/32416; WO 01/97783; WO 01/56544; WO 01/32217; WO 98/55107; WO 98/11879; WO 97/47285; WO 93/18755; and WO 90/11757.

Dosing

The therapeutically effective amount or dose of a compound described herein depends on the age, sex and weight of the patient, the current medical condition of the patient and the progression of pancreatic cancer in the patient being treated. The skilled artisan is able to determine appropriate dosages depending on these and other factors.

A suitable dose of a compound described herein can be in the range of from about 0.01 mg to about 5,000 mg per day, such as from about 0.1 mg to about 1,000 mg, for example, from about 1 mg to about 500 mg, such as about 5 mg to about 250 mg per day. The dose may be administered in a single dosage or in multiple dosages, for example from 1 to 4 or more times per day. When multiple dosages are used, the amount of each dosage may be the same or different. For example, a dose of 1 mg per day may be administered as two 0.5 mg doses, with about a 12-hour interval between doses.

It is understood that the amount of compound dosed per day may be administered, in non-limiting examples, every day, every other day, every 2 days, every 3 days, every 4 days, or every 5 days. For example, with every other day administration, a 5 mg per day dose may be initiated on Monday with a first subsequent 5 mg per day dose administered on Wednesday, a second subsequent 5 mg per day dose administered on Friday, and so on.

In the case wherein the patient's status does improve, upon the doctor's discretion the administration of the compound(s) described herein is optionally given continuously; alternatively, the dose of drug being administered is temporarily reduced or temporarily suspended for a certain length of time (i.e., a "drug holiday"). The length of the drug holiday optionally varies between 2 days and 1 year, including by way of example only, 2 days, 3 days, 4 days, 5 days, 6 days, 7 days, 10 days, 12 days, 15 days, 20 days, 28 days, 35 days, 50 days, 70 days, 100 days, 120 days, 150 days, 180 days, 200 days, 250 days, 280 days, 300 days, 320 days, 350 days, or 365 days. The dose reduction during a drug holiday includes from 10%-100%, including, by way of example only, 10%, 15%, 20%, 25%, 30%, 35%, 40%, 45%, 50%, 55%, 60%, 65%, 70%, 75%, 80%, 85%, 90%, 95%, or 100%.

Once improvement of the patient's conditions has occurred, a maintenance dose is administered if necessary. Subsequently, the dosage or the frequency of administration, or both, is reduced to a level at which the improved disease is retained. In certain embodiments, patients require intermittent treatment on a long-term basis upon any recurrence of symptoms and/or infection.

The compounds described herein can be formulated in unit dosage form. The term "unit dosage form" refers to physically discrete units suitable as unitary dosage for patients undergoing treatment, with each unit containing a predetermined quantity of active material calculated to produce the desired therapeutic effect, optionally in association with a suitable pharmaceutical carrier. The unit dosage form may be for a single daily dose or one of multiple daily doses (e.g., about 1 to 4 or more times per day). When multiple daily doses are used, the unit dosage form may be the same or different for each dose.

Toxicity and therapeutic efficacy of such therapeutic regimens are optionally determined in cell cultures or experimental animals, including, but not limited to, the determination of the $LD_{50}$ (the dose lethal to 50% of the population) and the $ED_{50}$ (the dose therapeutically effective in 50% of the population). The dose ratio between the toxic and therapeutic effects is the therapeutic index, which is expressed as the ratio between $LD_{50}$ and $ED_{50}$. The data obtained from cell culture assays and animal studies are optionally used in formulating a range of dosage for use in human. The dosage of such compounds lies preferably within a range of circulating concentrations that include the $ED_{50}$ with minimal toxicity. The dosage optionally varies within this range depending upon the dosage form employed and the route of administration utilized.

Those skilled in the art will recognize, or be able to ascertain using no more than routine experimentation, numerous equivalents to the specific procedures, embodiments, claims, and examples described herein. Such equivalents were considered to be within the scope of this invention and covered by the claims appended hereto. For example, it should be understood, that modifications in reaction conditions, including but not limited to reaction times, reaction size/volume, and experimental reagents, such as solvents, catalysts, pressures, atmospheric conditions, e.g., nitrogen atmosphere, and reducing/oxidizing agents, with art-recognized alternatives and using no more than routine experimentation, are within the scope of the present application.

The following examples further illustrate aspects of the present invention. However, they are in no way a limitation of the teachings or disclosure of the present invention as set forth herein.

EXAMPLES

Various embodiments of the present application can be better understood by reference to the following Examples which are offered by way of illustration. The scope of the present application is not limited to the Examples given herein.

Example 1: Testing of Pyrvinium Pamoate Compositions

Pyrvinium pamoate of varying concentrations was tested in both aqueous and oleaginous vehicles, with or without a nonionic emulsifier, to determine whether a stable solution could be achieved. As used here, a "stable solution" is a solution from which pyrvinium pamoate does not precipitate, or a solution that does not exhibit a separation of layers (phases), for at least or greater than about 24, 26, 28, 30, 32, 34, 36, 38, 40, 43, 44, 46, or 48 hours. For this work pyrvinium pamoate was solubilized in DMSO in varying concentrations (10-100 mM) and then pyrvinium pamoate in this DMSO was mixed with the emulsifying agents. After mixing with emulsifying agents, this mixture was added to vehicle (saline).

TABLE 5

Summary of the results of solubility experiments

| Trial | [PP] (mM) | PP in DMSO (µL) | Emulsifier (µL) | Vehicle (µL) | 24 h solubility | 48 h solubility | PP W/V % |
|---|---|---|---|---|---|---|---|
| A | 10 | 41 | 41[a] | 698[c] | Solution | Solution | 0.02949 |
| B | 10 | 20.5 | 20.54 | 739[c] | Solution | Solution | 0.014745 |
| C | 10 | 4.1 | 4.1[a] | 771[c] | Solution | Solution | 0.002949 |
| D | 10 | 41 | 0 | 739[c] | Precipitation | Precipitate | 0.02949 |
| E | 10 | 20.5 | 0 | 760[c] | Precipitation | Precipitate | 0.014745 |
| F | 10 | 4.1 | 0 | 760[c] | Precipitation | Precipitate | 0.002949 |
| G | 100 | 4.1 | 4.1[a] | 771[c] | Roughly 50% precipitation | Precipitate | 0.02949 |
| H | 100 | 2.05 | 2.05[a] | 773[c] | Roughly 50% precipitation | Precipitate | 0.014745 |
| I | 100 | 0.41 | 0.41[a] | 777[c] | Roughly 50% precipitation | Precipitate | 0.002949 |
| J | 20 | 20.5 | 20.5[a] | 739[c] | Solution | Solution | 0.02949 |
| K | 20 | 10.2 | 10.2[a] | 760[c] | Solution | Solution | 0.014745 |
| L | 20 | 2 | 2[a] | 776[c] | Solution | Solution | 0.002949 |
| M | 50 | 8.2 | 8.2[a] | 764[c] | Slight precipitate | Slight precipitate | 0.02949 |
| N | 50 | 4.1 | 4.1[a] | 772[c] | Slight precipitate | Slight precipitate | 0.014745 |
| O | 50 | 0.82 | 0.82[a] | 776[c] | Slight precipitate | Slight precipitate | 0.002949 |
| P | 10 | 41 | 739[b] | 0 | DMSO separated, PP in DMSO phase | DMSO separated, PP in DMSO phase | 0.02949 |

TABLE 5-continued

Summary of the results of solubility experiments

| Trial | [PP] (mM) | PP in DMSO (μL) | Emulsifier (μL) | Vehicle (μL) | 24 h solubility | 48 h solubility | PP W/V % |
|---|---|---|---|---|---|---|---|
| Q | 20 | 10.25 | 380[b] | 0 | Some precipitation | Precipitated | 0.02949 |
| R | 50 | 4.1 | 385[b] | 0 | Some precipitation | Precipitated | 0.02949 |
| S | 100 | 2.05 | 387[b] | 0 | Some precipitation | Precipitated | 0.02949 |
| T | 10 | 20.5 | 20.5[a] | 350[d] | Some DMSO separation, no precipitation | Small precipitation, DMSO separated | 0.014745 |
| U | 20 | 10.2 | 10.2[a] | 370[d] | Some DMSO separation, no precipitation | Small precipitation, DMSO separated | 0.014745 |
| V | 50 | 4.1 | 4.1[a] | 376[d] | Some DMSO separation, no precipitation | Small precipitation, DMSO separated | 0.014745 |
| W | 100 | 2.05 | 2.05[a] | 378[d] | Some DMSO separation, no precipitation | Small precipitation, DMSO separated | 0.014745 |

Legend:
PP is pyrvinium pamoate;
[a]emulsifier is CREMFOR ® EL;
[b]emulsifier is corn oil;
[c]vehicle is aqueous saline;
[d]vehicle is corn oil.
The concentration of pyrvinium pamaote ([PP] in the table) is the concentration of pyrvinium pamoate in DMSO.

Example 2: Comparison of Emulsifying Agents

For the following work, PP was dissolved in DMSO at varying concentrations (75 and 150 mM) and then mixed with various emulsifying agents. Saline was then added to the combination, which was then mixed. The efficacy of the mixture was determined by mixing, followed by the determination of separation or visible particles.

TABLE 6

Compositions comprising glycerol

| Glycerol (μL) | [PP] in DMSO | PP (μL) | Saline (μL) | Solubility | Final [PP] (mM) | PP w/v % |
|---|---|---|---|---|---|---|
| 7.5 | 150 mM | 15.2 | 127 | Particles Visible | 15.2 | 0.873 |
| 7.5 | 150 mM | 8.7 | 134 | Particles Visible | 8.7 | 0.500 |
| 7.5 | 150 mM | 2.2 | 140 | Particles Visible | 2.2 | 0.126 |
| 7.5 | 150 mM | 0.43 | 142 | Particles Visible | 0.43 | 0.025 |
| 7.5 | 75 mM | 30.4 | 112 | Particles Visible | 15.2 | 0.873 |
| 7.5 | 75 mM | 17.4 | 125 | Particles Visible | 8.7 | 0.500 |
| 7.5 | 75 mM | 4.3 | 138 | Particles Visible | 2.2 | 0.126 |
| 7.5 | 75 mM | 0.86 | 142 | Particles Visible | 0.43 | 0.025 |
| 15 | 150 mM | 15.2 | 120 | Particles Visible | 15.2 | 0.873 |
| 15 | 150 mM | 8.7 | 126 | Particles Visible | 8.7 | 0.500 |
| 15 | 150 mM | 2.2 | 133 | Particles Visible | 2.2 | 0.126 |
| 15 | 150 mM | 0.43 | 135 | Particles Visible | 0.43 | 0.025 |
| 15 | 75 mM | 30.4 | 105 | Particles Visible | 15.2 | 0.873 |
| 15 | 75 mM | 17.4 | 118 | Particles Visible | 8.7 | 0.500 |
| 15 | 75 mM | 4.3 | 131 | Particles Visible | 2.2 | 0.126 |
| 15 | 75 mM | 0.86 | 134 | Particles Visible | 0.43 | 0.025 |
| 30 | 150 mM | 15.2 | 105 | Particles Visible | 15.2 | 0.873 |
| 30 | 150 mM | 8.7 | 111 | Particles Visible | 8.7 | 0.500 |
| 30 | 150 mM | 2.2 | 118 | Particles Visible | 2.2 | 0.126 |
| 30 | 150 mM | 0.43 | 120 | Particles Visible | 0.43 | 0.025 |
| 30 | 75 mM | 30.4 | 90 | Particles Visible | 15.2 | 0.873 |
| 30 | 75 mM | 17.4 | 103 | Particles Visible | 8.7 | 0.500 |
| 30 | 75 mM | 4.3 | 116 | Particles Visible | 2.2 | 0.126 |

TABLE 6-continued

Compositions comprising glycerol

| Glycerol (µL) | [PP] in DMSO | PP (µL) | Saline (µL) | Solubility | Final [PP] (mM) | PP w/v % |
|---|---|---|---|---|---|---|
| 30 | 75 mM | 0.86 | 119 | No particles Visible | 0.43 | 0.025 |

TABLE 7

Compositions comprising sodium deoxycholate

| Sodium Deoxycholate (70 mM) | [PP] in DMSO | PP (HL) | Saline (µL) | Solubility | Final [PP] (mM) | PP w/v % |
|---|---|---|---|---|---|---|
| 6.4 | 150 mM | 15.2 | 128 | Particles Visible | 15.2 | 0.873 |
| 6.4 | 150 mM | 8.7 | 135 | Particles Visible | 8.7 | 0.500 |
| 6.4 | 150 mM | 2.2 | 141 | Particles Visible | 2.2 | 0.126 |
| 6.4 | 150 mM | 0.43 | 143 | Particles Visible | 0.43 | 0.025 |
| 6.4 | 75 mM | 30.4 | 113 | Particles Visible | 15.2 | 0.873 |
| 6.4 | 75 mM | 17.4 | 126 | Particles Visible | 8.7 | 0.500 |
| 6.4 | 75 mM | 4.3 | 139 | Particles Visible | 2.2 | 0.126 |
| 6.4 | 75 mM | 0.86 | 143 | No particles Visible | 0.43 | 0.025 |
| 12.9 | 150 mM | 15.2 | 122 | Particles Visible | 15.2 | 0.873 |
| 12.9 | 150 mM | 8.7 | 128 | Particles Visible | 8.7 | 0.500 |
| 12.9 | 150 mM | 2.2 | 135 | Particles Visible | 2.2 | 0.126 |
| 12.9 | 150 mM | 0.43 | 137 | Particles Visible | 0.43 | 0.025 |
| 12.9 | 75 mM | 30.4 | 107 | Particles Visible | 15.2 | 0.873 |
| 12.9 | 75 mM | 17.4 | 120 | Particles Visible | 8.7 | 0.500 |
| 12.9 | 75 mM | 4.3 | 133 | Particles Visible | 2.2 | 0.126 |
| 12.9 | 75 mM | 0.86 | 136 | Particles Visible | 0.43 | 0.025 |
| 25.7 | 150 mM | 15.2 | 109 | Particles Visible | 15.2 | 0.873 |
| 25.7 | 150 mM | 8.7 | 116 | Particles Visible | 8.7 | 0.500 |
| 25.7 | 150 mM | 2.2 | 122 | Particles Visible | 2.2 | 0.126 |
| 25.7 | 150 mM | 0.43 | 124 | Particles Visible | 0.43 | 0.025 |
| 25.7 | 75 mM | 30.4 | 94 | Particles Visible | 15.2 | 0.873 |
| 25.7 | 75 mM | 17.4 | 107 | Particles Visible | 8.7 | 0.500 |
| 25.7 | 75 mM | 4.3 | 120 | Particles Visible | 2.2 | 0.126 |
| 25.7 | 75 mM | 0.86 | 123 | No particles Visible | 0.43 | 0.025 |

TABLE 8

Compositions comprising polyethylene glycol

| Polyethylene Glycol (PEG) 300 | [PP] in DMSO | PP (µL) | Saline (µL) | Solubility | Final [PP] (mM) | PP w/v % |
|---|---|---|---|---|---|---|
| 1.5 | 150 mM | 15.2 | 133 | Particles Visible | 15.2 | 0.873 |
| 1.5 | 150 mM | 8.7 | 140 | Particles Visible | 8.7 | 0.500 |
| 1.5 | 150 mM | 2.2 | 146 | Particles Visible | 2.2 | 0.126 |
| 1.5 | 150 mM | 0.43 | 148 | Particles Visible | 0.43 | 0.025 |
| 1.5 | 75 mM | 30.4 | 118 | Particles Visible | 15.2 | 0.873 |
| 1.5 | 75 mM | 17.4 | 131 | Particles Visible | 8.7 | 0.500 |
| 1.5 | 75 mM | 4.3 | 144 | Particles Visible | 2.2 | 0.126 |
| 1.5 | 75 mM | 0.86 | 148 | No particles Visible | 0.43 | 0.025 |
| 3.75 | 150 mM | 15.2 | 131 | Particles Visible | 15.2 | 0.873 |
| 3.75 | 150 mM | 8.7 | 138 | Particles Visible | 8.7 | 0.500 |
| 3.75 | 150 mM | 2.2 | 144 | Particles Visible | 2.2 | 0.126 |
| 3.75 | 150 mM | 0.43 | 146 | Particles Visible | 0.43 | 0.025 |
| 3.75 | 75 mM | 30.4 | 116 | Particles Visible | 15.2 | 0.873 |
| 3.75 | 75 mM | 17.4 | 129 | Particles Visible | 8.7 | 0.500 |
| 3.75 | 75 mM | 4.3 | 142 | Particles Visible | 2.2 | 0.126 |
| 3.75 | 75 mM | 0.86 | 145 | No particles Visible | 0.43 | 0.025 |
| 7.5 | 150 mM | 15.2 | 127 | Particles Visible | 15.2 | 0.873 |
| 7.5 | 150 mM | 8.7 | 134 | Particles Visible | 8.7 | 0.500 |
| 7.5 | 150 mM | 2.2 | 140 | Particles Visible | 2.2 | 0.126 |
| 7.5 | 150 mM | 0.43 | 142 | No particles Visible | 0.43 | 0.025 |
| 7.5 | 75 mM | 30.4 | 112 | Particles Visible | 15.2 | 0.873 |
| 7.5 | 75 mM | 17.4 | 125 | Particles Visible | 8.7 | 0.500 |
| 7.5 | 75 mM | 4.3 | 138 | Particles Visible | 2.2 | 0.126 |
| 7.5 | 75 mM | 0.86 | 142 | No particles Visible | 0.43 | 0.025 |

TABLE 9

Compositions comprising Neobee M-5

| Neobee M-5 | [PP] in DMSO | PP (µL) | Saline (µL) | Solubility | Final [PP] (mM) | PP w/v % |
|---|---|---|---|---|---|---|
| 1.5 | 150 mM | 15.2 | 133 | Particles Visible | 15.2 | 0.873 |
| 1.5 | 150 mM | 8.7 | 140 | Particles Visible | 8.7 | 0.500 |
| 1.5 | 150 mM | 2.2 | 146 | Particles Visible | 2.2 | 0.126 |
| 1.5 | 150 mM | 0.43 | 148 | Particles Visible | 0.43 | 0.025 |
| 1.5 | 75 mM | 30.4 | 118 | Particles Visible | 15.2 | 0.873 |
| 1.5 | 75 mM | 17.4 | 131 | Particles Visible | 8.7 | 0.500 |
| 1.5 | 75 mM | 4.3 | 144 | Particles Visible | 2.2 | 0.126 |

TABLE 9-continued

Compositions comprising Neobee M-5

| Neobee M-5 | [PP] in DMSO | PP (μL) | Saline (μL) | Solubility | Final [PP] (mM) | PP w/v % |
|---|---|---|---|---|---|---|
| 1.5 | 75 mM | 0.86 | 148 | Particles Visible | 0.43 | 0.025 |
| 3.75 | 150 mM | 15.2 | 131 | Particles Visible | 15.2 | 0.873 |
| 3.75 | 150 mM | 8.7 | 138 | Particles Visible | 8.7 | 0.500 |
| 3.75 | 150 mM | 2.2 | 144 | Particles Visible | 2.2 | 0.126 |
| 3.75 | 150 mM | 0.43 | 146 | Particles Visible | 0.43 | 0.025 |
| 3.75 | 75 mM | 30.4 | 116 | Particles Visible | 15.2 | 0.873 |
| 3.75 | 75 mM | 17.4 | 129 | Particles Visible | 8.7 | 0.500 |
| 3.75 | 75 mM | 4.3 | 142 | Particles Visible | 2.2 | 0.126 |
| 3.75 | 75 mM | 0.86 | 145 | Particles Visible | 0.43 | 0.025 |
| 7.5 | 150 mM | 15.2 | 127 | Particles Visible | 15.2 | 0.873 |
| 7.5 | 150 mM | 8.7 | 134 | Particles Visible | 8.7 | 0.500 |
| 7.5 | 150 mM | 2.2 | 140 | Particles Visible | 2.2 | 0.126 |
| 7.5 | 150 mM | 0.43 | 142 | Particles Visible | 0.43 | 0.025 |
| 7.5 | 75 mM | 30.4 | 112 | Particles Visible | 15.2 | 0.873 |
| 7.5 | 75 mM | 17.4 | 125 | Particles Visible | 8.7 | 0.500 |
| 7.5 | 75 mM | 4.3 | 138 | Particles Visible | 2.2 | 0.126 |
| 7.5 | 75 mM | 0.86 | 142 | Particles Visible | 0.43 | 0.025 |

TABLE 10

Compositions comprising Kolliphor EL

| Kolliphor EL | [PP] in DMSO | PP (μL) | Saline (μL) | Solubility | Final [PP] (mM) | PP w/v % |
|---|---|---|---|---|---|---|
| 1.5 | 150 mM | 15.2 | 133 | Particles Visible | 15.2 | 0.873 |
| 1.5 | 150 mM | 8.7 | 140 | Particles Visible | 8.7 | 0.500 |
| 1.5 | 150 mM | 2.2 | 146 | Particles Visible | 2.2 | 0.126 |
| 1.5 | 150 mM | 0.43 | 148 | Particles Visible | 0.43 | 0.025 |
| 1.5 | 75 mM | 30.4 | 118 | No particles Visible | 15.2 | 0.873 |
| 1.5 | 75 mM | 17.4 | 131 | No particles Visible | 8.7 | 0.500 |
| 1.5 | 75 mM | 4.3 | 144 | No particles Visible | 2.2 | 0.126 |
| 1.5 | 75 mM | 0.86 | 148 | No particles Visible | 0.43 | 0.025 |
| 3.75 | 150 mM | 15.2 | 131 | Particles Visible | 15.2 | 0.873 |
| 3.75 | 150 mM | 8.7 | 138 | Particles Visible | 8.7 | 0.500 |
| 3.75 | 150 mM | 2.2 | 144 | Particles Visible | 2.2 | 0.126 |
| 3.75 | 150 mM | 0.43 | 146 | Particles Visible | 0.43 | 0.025 |
| 3.75 | 75 mM | 30.4 | 116 | No particles Visible | 15.2 | 0.873 |
| 3.75 | 75 mM | 17.4 | 129 | No particles Visible | 8.7 | 0.500 |
| 3.75 | 75 mM | 4.3 | 142 | No particles Visible | 2.2 | 0.126 |
| 3.75 | 75 mM | 0.86 | 145 | No particles Visible | 0.43 | 0.025 |
| 7.5 | 150 mM | 15.2 | 127 | No particles Visible | 15.2 | 0.873 |
| 7.5 | 150 mM | 8.7 | 134 | No particles Visible | 8.7 | 0.500 |
| 7.5 | 150 mM | 2.2 | 140 | Particles Visible | 2.2 | 0.126 |
| 7.5 | 150 mM | 0.43 | 142 | No particles Visible | 0.43 | 0.025 |
| 7.5 | 75 mM | 30.4 | 112 | No particles Visible | 15.2 | 0.873 |
| 7.5 | 75 mM | 17.4 | 125 | No particles Visible | 8.7 | 0.500 |
| 7.5 | 75 mM | 4.3 | 138 | No particles Visible | 2.2 | 0.126 |
| 7.5 | 75 mM | 0.86 | 142 | No particles Visible | 0.43 | 0.025 |

Example 3: Use of Acetic Acid in Composition

For the following work, pyrvinium pamoate (PP) was dissolved in polar solvents at varying concentrations (10 and 100 mM). The solubility of pyrvinium pamoate in the composition was determined by mixing, followed by the determination of separation or visible particles.

TABLE 11

Compositions comprising acetic acid

| Trial | [PP] (mM) | Solvent | Early Solubility | 24 h solubility |
|---|---|---|---|---|
| A | 10 | DMSO | No particles Visible | Solution |
| B | 100 | DMSO | No particles Visible | Solution |
| C | 10 | Ethanol | Particles Visible | Precipitation |
| D | 100 | Ethanol | Particles Visible | Precipitation |
| F | 10 | Acetate in Ethanol (50% v/v) | No particles Visible | Solution |
| G | 100 | Acetate in Ethanol (50% v/v) | No particles Visible | Precipitation |
| H | 10 | Acetate in DI H$_2$O (50% v/v) | No particles Visible | Precipitation |
| I | 100 | Acetate in DI H$_2$O (50% v/v) | No particles Visible | Precipitation |
| J | 10 | 2M Citrate in 30% Ethanol (50% v/v) | No particles Visible | Precipitation |
| K | 100 | 2M Citrate in 30% Ethanol (50% v/v) | No particles Visible | Precipitation |
| L | 10 | PBS | No particles Visible | Precipitation |
| M | 100 | PBS | No particles Visible | Precipitation |

The terms and expressions employed herein are used as terms of description and not of limitation, and there is no intention in the use of such terms and expressions of excluding any equivalents of the features shown and described or portions thereof, but it is recognized that various modifications are possible within the scope of the embodiments of the present application. Thus, it should be understood that although the present application describes specific embodiments and optional features, modification and variation of the compositions, methods, and concepts

ENUMERATED EMBODIMENTS

The following exemplary embodiments are provided, the numbering of which is not to be construed as designating levels of importance:

Embodiment 1 provides a composition comprising: about 0.01 to 5% w/v pyrvinium salt; about 5 to 20% v/v of a polar solvent; about 0 to 15% v/v of a nonionic emulsifier; and about 60 to 90% v/v of an aqueous vehicle, wherein the composition is a solution.

Embodiment 2 provides the composition of Embodiment 1, wherein the pyrvinium salt is pyrvinium pamoate.

Embodiment 3 provides the composition of any of Embodiments 1-2, wherein the polar solvent is selected from the group consisting of DMSO, acetic acid, ethanol, and mixtures thereof.

Embodiment 4 provides the composition of any of Embodiments 1-3, wherein the polar solvent is DMSO.

Embodiment 5 provides the composition of any of Embodiments 1-4, wherein the nonionic emulsifier is present in an amount of about 5 to 15% v/v.

Embodiment 6 provides the composition of any of Embodiments 1-5, wherein the nonionic emulsifier is at least one selected from the group consisting of polyethoxylated oils, fatty alcohol ethoxylates, fatty acid ethoxylates, EO-PO block co-polymers, sorbitan ester ethoxylates, lanolin alcohol ethoxylates, polyol esters, and lanolin alcohols.

Embodiment 7 provides the composition of any of Embodiments 1-6, wherein the nonionic emulsifier is polyethoxylated castor oil.

Embodiment 8 provides the composition of any of Embodiments 1-7, wherein the pyrvinium salt does not precipitate and no separation of layers is observed for at least about 24 hours.

Embodiment 9 provides a pharmaceutical composition comprising the composition of any of Embodiments 1-8.

Embodiment 10 provides the composition of Embodiment 9, which is suitable for oral administration.

Embodiment 11 provides a method of treating, ameliorating, and/or preventing pancreatic cancer, the method comprising orally administering a therapeutically effective amount of the composition of any one of Embodiments 1-10 to a subject in need thereof.

Embodiment 12 provides the method of Embodiment 11, wherein the subject has a pyrvinium plasma concentration of about 1 ng/mL to about 3 ng/mL at about 1 hour after administration of the composition.

Embodiment 13 provides the method of any of Embodiments 11-12, wherein the subject has a pyrvinium plasma concentration of about 1 ng/mL to about 2 ng/mL at about 4 hours after administration of the composition.

Embodiment 14 provides the method of any of Embodiments 11-13, wherein the subject has a pyrvinium plasma concentration of about 1 ng/mL to about 2 ng/mL at up to about 5 hours after administration of the composition.

Embodiment 15 provides the method of any of Embodiments 11-14, wherein the subject has a pyrvinium concentration in the pancreas of about 5 ng/mL to about 10 ng/mL at about 2 hours after administration of the composition.

Embodiment 16 provides the method of any of Embodiments 11-15, wherein the subject has a pyrvinium concentration in the pancreas of about 1 ng/mL to about 5 ng/mL at about 8 hours after administration of the composition.

Embodiment 17 provides the method of any of Embodiments 11-16, wherein the subject has a pyrvinium concentration in the pancreas of about 1 ng/mL to about 4 ng/mL at up to about 8 hours after administration of the composition.

Embodiment 18 provides the method of any of Embodiments 11-17, wherein the subject is human.

Embodiment 19 provides a method of decreasing the chemoresistive potential of HuR protein in a subject, the method comprising: orally administering a therapeutically effective amount of the composition of any one of Embodiments 1-10 to the subject, thereby decreasing the chemoresistive potential of HuR protein in the subject.

Embodiment 20 provides the method of Embodiment 19, wherein the chemoresistive potential of HuR protein is decreased in the pancreas of the subject.

Embodiment 21 provides the method of any of Embodiments 19-20, wherein the subject has at least one cancerous pancreatic tumor.

Embodiment 22 provides the method of any of Embodiments 19-21, wherein the pancreatic tumor is a pancreatic ductal adenocarcinoma.

Embodiment 23 provides the method of any of Embodiments 19-22, wherein the volume of the at least one pancreatic tumor decreases, or does not further increase, after the administering.

Embodiment 24 provides the method of any of Embodiments 19-23, wherein the subject is a human.

The disclosures of each and every patent, patent application, and publication cited herein are hereby incorporated herein by reference in their entirety. While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

What is claimed is:

1. A composition comprising:
about 0.01 to 5% w/v of a pyrvinium salt;
about 5 to 20% v/v of a polar solvent;
about 0 to 15% v/v of a nonionic emulsifier; and
about 60 to 90% v/v of an aqueous vehicle,
wherein the composition is a solution.

2. The composition of claim 1, wherein the pyrvinium salt is pyrvinium pamoate.

3. The composition of claim 2, wherein the polar solvent is selected from the group consisting of dimethylsulfoxide (DMSO), acetic acid, ethanol, and mixtures thereof.

4. The composition of claim 3, wherein the polar solvent is DMSO.

5. The composition of claim 1, wherein the nonionic emulsifier is present in an amount of about 5 to 15% v/v.

6. The composition of claim 1, wherein the nonionic emulsifier is at least one selected from the group consisting of polyethoxylated oils, fatty alcohol ethoxylates, fatty acid ethoxylates, EO-PO block co-polymers, sorbitan ester ethoxylates, lanolin alcohol ethoxylates, polyol esters, and lanolin alcohols.

7. The composition of claim 6, wherein the nonionic emulsifier is a polyethoxylated castor oil.

8. The composition of claim 1, wherein the pyrvinium salt does not precipitate and wherein no separation of layers is observed for at least about 24 hours.

9. A pharmaceutical composition comprising the composition of claim 1.

10. The pharmaceutical composition of claim 9, which is suitable for oral administration.

11. A method of treating or ameliorating pancreatic cancer, the method comprising orally administering to a subject in need thereof a therapeutically effective amount of a composition comprising
   about 0.01 to 5% w/v of a pyrvinium salt;
   about 5 to 20% v/v of a polar solvent;
   about 0 to 15% v/v of a nonionic emulsifier; and
   about 60 to 90% v/v of an aqueous vehicle,
   wherein the composition is a solution.

12. The method of claim 11, wherein at least one of the following applies:
   (a) the subject has a pyrvinium plasma concentration of about 1 ng/ml to about 3 ng/ml at about 1 hour after administration of the composition;
   (b) the subject has a pyrvinium plasma concentration of about 1 ng/ml to about 2 ng/ml at about 4 hours after administration of the composition; and
   (c) the subject has a pyrvinium plasma concentration of about 1 ng/mL to about 2 ng/mL at about 5 hours after administration of the composition.

13. The method of claim 11, wherein at least one of the following applies:
   (a) the subject has a pancreas pyrvinium concentration of about 5 ng/mL to about 10 ng/ml at about 2 hours after administration of the composition; and
   (b) the subject has a pancreas pyrvinium concentration of about 1 ng/ml to about 5 ng/ml at about 8 hours after administration of the composition.

14. The method of claim 11, wherein the subject is human.

15. A method of decreasing HuR protein chemoresistive potential in a subject, the method comprising orally administering to the subject a therapeutically effective amount of a composition comprising
   about 0.01 to 5% w/v of a pyrvinium salt;
   about 5 to 20% v/v of a polar solvent;
   about 0 to 15% v/v of a nonionic emulsifier; and
   about 60 to 90% v/v of an aqueous vehicle,
   wherein the composition is a solution.

16. The method of claim 15, wherein the chemoresistive potential of HuR protein is decreased in the pancreas of the subject.

17. The method of claim 15, wherein the subject has at least one cancerous pancreatic tumor.

18. The method of claim 17, wherein the pancreatic tumor is a pancreatic ductal adenocarcinoma.

19. The method of claim 17, wherein the volume of the at least one pancreatic tumor decreases, or does not further increase, after the administering.

20. The method of claim 15, wherein the subject is a human.

* * * * *